United States Patent
Shimosato

(10) Patent No.: US 11,429,329 B2
(45) Date of Patent: Aug. 30, 2022

(54) PRINTING SYSTEM, PRINTING APPARATUS, AND METHOD OF CONTROLLING ACTIVATION OF PRINTING APPARATUS

(71) Applicant: Seiko Epson Corporation, Tokyo (JP)

(72) Inventor: Hiroaki Shimosato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/510,733

(22) Filed: Oct. 26, 2021

(65) Prior Publication Data

US 2022/0129223 A1    Apr. 28, 2022

(30) Foreign Application Priority Data

Oct. 28, 2020    (JP) .............................. JP2020-180476

(51) Int. Cl.
    *G06F 3/12*    (2006.01)
(52) U.S. Cl.
    CPC .......... *G06F 3/1263* (2013.01); *G06F 3/1217* (2013.01); *G06F 3/1221* (2013.01); *G06F 3/1231* (2013.01)
(58) Field of Classification Search
    CPC .... G06F 3/1263; G06F 3/1217; G06F 3/1221; G06F 3/1231
    USPC ...................................................... 358/1.14
    See application file for complete search history.

(56) References Cited

U.S. PATENT DOCUMENTS

| 5,758,228 | A  | * | 5/1998 | Hirose | ............... | G05D 23/1913 |
| | | | | | | 399/70 |
| 8,520,237 | B2 | * | 8/2013 | Iwase | ...................... | G06F 3/126 |
| | | | | | | 358/1.14 |
| 2005/0128515 | A1 | * | 6/2005 | Ohno | .................. | H04N 1/00904 |
| | | | | | | 358/1.14 |
| 2013/0188224 | A1 | * | 7/2013 | Moriyama | ............ | G06F 3/1292 |
| | | | | | | 358/1.15 |
| 2016/0026413 | A1 | * | 1/2016 | Yamada | ............. | H04N 1/00896 |
| | | | | | | 358/1.14 |
| 2016/0196483 | A1 | * | 7/2016 | Kobayashi | ........... | G06K 15/406 |
| | | | | | | 358/1.14 |

FOREIGN PATENT DOCUMENTS

JP          2017-019181          1/2017

* cited by examiner

*Primary Examiner* — Allen H Nguyen
(74) *Attorney, Agent, or Firm* — Workman Nydegger

(57) ABSTRACT

A printing system includes a first printer configured to execute an initial operation to transition to a printable state when receiving an activation instruction and a second printer configured to execute an initial operation to transition to a printable state when receiving an activation instruction. Activation instruction processing for outputting the activation instruction to the second printer is executed when the second printer is designated as a following printer to be activated subsequently to the first printer. In the activation instruction processing, the activation instruction is output to the second printer at second activation timing obtained based on, with timing at which the first printer receives the activation instruction as a starting point, a first initial operation time, a first maintenance time, and a second initial operation time.

9 Claims, 11 Drawing Sheets

PRINTING SYSTEM, PRINTING APPARATUS, AND METHOD OF CONTROLLING ACTIVATION OF PRINTING APPARATUS

The present application is based on, and claims priority from JP Application Serial Number 2020-180476, filed Oct. 28, 2020, the disclosure of which is hereby incorporated by reference herein in its entirety.

BACKGROUND

1. Technical Field

The present disclosure relates to a printing system, a printing apparatus, and a method of controlling activation of the printing apparatus.

2. Related Art

There has been known a printing system in which a plurality of printing apparatuses are communicably connected to one another.

For example, JP-A-2017-19181 describes a printing system that performs control of preventing maintenance times of a plurality of printing apparatuses from overlapping each other.

However, JP-A-2017-19181 does not describe a maintenance operation (for example, setting of sheets and nozzle check) executed by a user at the time of activating the printing apparatuses.

For example, when a user sequentially activates the plurality of printing apparatuses, a waiting time is generated for the user, which degrades workability of the user. Further, for example, when the plurality of apparatuses are activated simultaneously, power is consumed excessively, which degrades lifetimes of the consumables.

An advantage of some aspects of the present disclosure is to activate a plurality of printing apparatuses at appropriate timing.

SUMMARY

In order to solve the above-mentioned problem, a printing system according to one aspect includes a first printing apparatus configured to execute an initial operation to transition to a printable state when receiving an activation instruction, and a second printing apparatus configured to execute an initial operation to transition to a printable state when receiving an activation instruction. Activation instruction processing for outputting the activation instruction to the second printing apparatus is executed when the second printing apparatus is the second printing apparatus is designated as a following printing apparatus to be activated subsequently to the first printing apparatus. In the activation instruction processing, the activation instruction is output to the second printing apparatus at second activation timing obtained based on, with timing at which the first printing apparatus receives the activation instruction as a starting point, a first initial operation time required for the initial operation of the first printing apparatus, a first maintenance time required for a maintenance operation executed after the first printing apparatus executes the initial operation, and a second initial operation time required for the initial operation of the second printing apparatus.

In order to solve the above-mentioned problem, a printing apparatus according to another aspect is configured to execute an initial operation to transition to a printable state when receiving an activation instruction. The printing apparatus includes a communication unit communicably connected to a second printing apparatus configured to execute an initial operation to transition to a printable state when receiving an activation instruction, an activation instruction reception unit configured to receive the activation instruction, a designation reception unit configured to receive designation of a following printing apparatus to be activated subsequently to the printing apparatus, a clocking unit configured to measure an elapsed time from timing at which the activation instruction is received, and an activation control unit configured to execute activation instruction processing for outputting the activation instruction to the second printing apparatus when the second printing apparatus is designated as the following printing apparatus. In the activation instruction processing, the activation control unit outputs the activation instruction to the second printing apparatus at second activation timing obtained based on, with timing at which the printing apparatus receives the activation instruction as a starting point, a first initial operation time required for the initial operation of the printing apparatus, a maintenance time required for a maintenance operation executed after the printing apparatus executes the initial operation, and a second initial operation time required for the initial operation of the second printing apparatus.

In order to solve the above-mentioned problem, a method of controlling activation of a printing apparatus according to further another aspect is a method used for activating a first printing apparatus configured to execute an initial operation to transition to a printable state when receiving an activation instruction and a second printing apparatus configured to execute an initial operation to transition to a printable state when receiving an activation instruction. Activation instruction processing for outputting the activation instruction to the second printing apparatus is executed when the second printing apparatus is the second printing apparatus is designated as a following printing apparatus to be activated subsequently to the first printing apparatus. In the activation instruction processing, the activation instruction is output to the second printing apparatus at second activation timing obtained based on, with timing at which the first printing apparatus receives the activation instruction as a starting point, a first initial operation time required for the initial operation of the first printing apparatus, a first maintenance time required for a maintenance operation executed after the first printing apparatus executes the initial operation, and a second initial operation time required for the initial operation of the second printing apparatus.

DESCRIPTION OF EXEMPLARY EMBODIMENTS

With reference to the drawings, exemplary embodiments are described below. A printing system 100 according to the present exemplary embodiments includes a printing system 100A according to a first exemplary embodiment described with reference to FIG. 1 to FIG. 6 and a printing system 100B according to a second exemplary embodiment described with reference to FIG. 7 to FIG. 9.

First Exemplary Embodiment

First, the printing system 100A according to the first exemplary embodiment is described.

Figure 1:
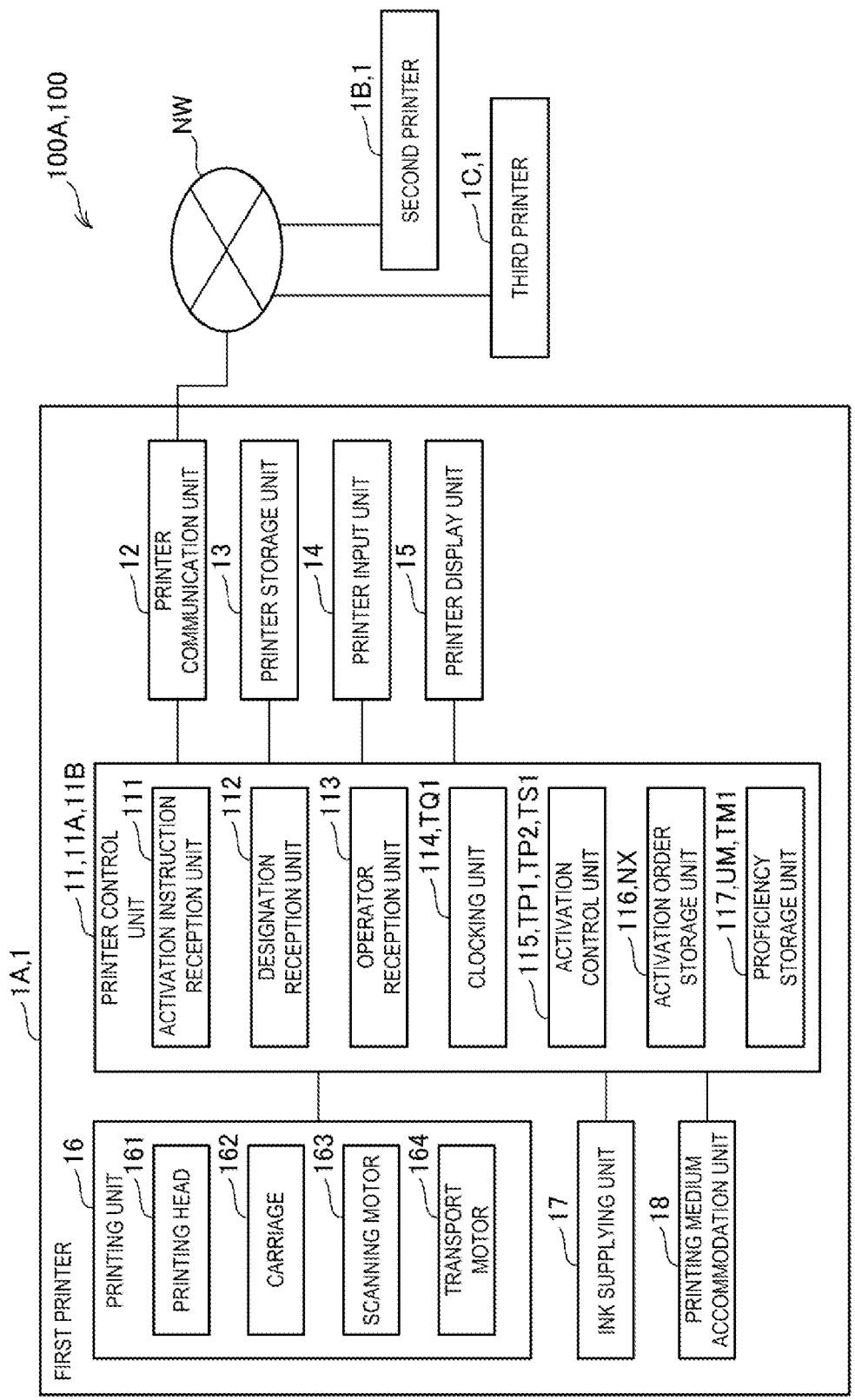
FIG. 1 is a view illustrating one example of a configuration of a printing system according to a first exemplary embodiment.

FIG. 1 is a view illustrating one example of a configuration of the printing system 100A according to the first exemplary embodiment.

The printing system 100A includes printers 1. The printers 1 include a first printer 1A, a second printer 1B, and a third printer 1C.

The first printer 1A, the second printer 1B, and the third printer 1C are communicably connected to one another via a network NW.

For example, the network NW is a Local Area Network (LAN). The network NW may be a Wide Area Network (WAN) or the Internet.

The printer 1 corresponds to one example of a "printing apparatus".

The first printer 1A corresponds to one example of a "first printing apparatus". The second printer 1B corresponds to one example of a "second printing apparatus". The third printer 1C corresponds to one example of a "third printing apparatus".

Note that, when the first printer 1A, the second printer 1B, and the third printer 1C are not distinguished from one another, each of the first printer 1A, the second printer 1B, and the third printer 1C is referred to as the printer 1 in some cases in the following description.

Next, the printer 1 is described. The first printer 1A, the second printer 1B, and the third printer 1C have substantially the same configurations, and hence the configuration of the first printer 1A is described, and description of the second printer 1B and the third printer 1C is omitted.

The first printer 1A is an apparatus that prints a character, an image, and the like on a printing medium such as a printing sheet. The first printer 1A of the present exemplary embodiment is a printer that is used at, for example, a printing company and executes printing on a relatively large printing medium. The first printer 1A is communicatively connected to a computer (omitted in illustration), and executes a print job based on print data received from the computer.

As illustrated in FIG. 1, the first printer 1A includes a printer control unit 11, a printer communication unit 12, a printer storage unit 13, a printer input unit 14, a printer display unit 15, a printing unit 16, an ink supplying unit 17, and a printing medium accommodation unit 18.

The printer control unit 11 includes a processor 11A such as a Central Processing Unit (CPU), a memory 11B such as a Read Only Memory (ROM) and a Random Access Memory (RAM), an Application Specific Integrated Circuit (ASIC), a signal processing circuit, and the like, and controls each unit of the first printer 1A. The memory 11B stores a control program.

The memory 11B corresponds to one example of a "storage unit".

For example, the processor 11A executes processing by reading the control program stored in the memory 11B, the processing is executed by a function mounted to the ASIC, or the processing is executed by executing signal processing in the signal processing circuit. With this, the printer control unit 11 executes processing by collaboration between hardware and software.

As functional blocks, the printer control unit 11 includes an activation instruction reception unit 111, a designation reception unit 112, an operator reception unit 113, a clocking unit 114, an activation control unit 115, an activation order storage unit 116, and a proficiency storage unit 117.

The functional blocks represent, for the sake of convenience, functions as blocks, which are achieved by the processor 11A executing a control program, and do not represent a specific application program and hardware. The functional blocks are described later.

Under control of the printer control unit 11, the printer communication unit 12 communicates with the other printers 1, specifically, the second printer 1B and the third printer 1C in accordance with a predetermined communication standard.

The printer communication unit 12 corresponds to one example of a "communication unit".

The printer storage unit 13 includes a non-volatile memory such as a Hard Disk Drive (HDD), an Electrically Erasable Programmable Read-Only Memory (EEPROM), and a Solid State Drive (SSD), and stores various data in a re-writable manner.

The printer input unit 14 includes an input means such as an operation switch and a touch panel provided to the first printer 1A, detects an operation of a user with respect to the input means, and outputs, to the printer control unit 11, a detection signal corresponding to the operation. Based on the input from the printer input unit 14, the printer control unit 11 executes processing corresponding to the operation of the user.

The printer display unit 15 includes a plurality of Light Emitting Diodes (LEDs), a display panel, and the like, and executes turning on, turning off, or flashing of LEDs in a predetermined mode or displays information on the display panel under control of the printer control unit 11.

Under control of the printer control unit 11, the printing unit 16 prints a character, an image, and the like on a printing medium with ink. As a configuration relating to printing, the printing unit 16 includes, for example, a printing head 161, a carriage 162, a scanning motor 163, and a transport motor 164.

The printing head 161 is an ink-jet type, and jets ink, which is supplied from the ink supplying unit 17, onto a printing medium. The carriage 162 on which the printing head 161 is mounted performs scanning in a direction intersecting a transport direction of a printing medium. The scanning motor 163 causes the carriage 162 to perform scanning. The transport motor 164 transports a printing medium in the transport direction.

The ink supplying unit 17 accommodates an ink tank that stores ink, and supplies the ink from the ink tank to the printing head 161 of the printing unit 16. The ink supplied by the ink supplying unit 17 includes ink of respective colors such as cyan (C), magenta (M), yellow (Y), and black (K).

The printing medium accommodation unit 18 is configured to accommodate a printing medium. When the printing medium is, for example, roll paper, the roll paper accommodated therein is transported by the transport motor 164, and is fed out to a transport path (omitted in illustration). Note that the printing medium accommodation unit 18 may have a configuration of collecting a printing medium after printing, specifically, a printed object, for example, a configuration of winding roll paper.

Next, the functional blocks included in the printer control unit 11 of the first printer 1A are described. Note that, in the first exemplary embodiment, description is given when the first printer 1A receives an activation instruction from an operator and is activated, the first printer 1A instructs activation of the second printer 1B, and the second printer 1B instructs activation of the third printer 1C.

As functional blocks, the printer control unit 11 includes the activation instruction reception unit 111, the designation reception unit 112, the operator reception unit 113, the clocking unit 114, the activation control unit 115, the activation order storage unit 116, and the proficiency storage unit 117.

Specifically, the processor 11A executes the control program stored in the memory 11B, and thus the functions of the activation instruction reception unit 111, the designation reception unit 112, the operator reception unit 113, the clocking unit 114, and the activation control unit 115 are realized. The processor 11A executes the control program stored in the memory 11B, and thus causes the memory 11B to function as the activation order storage unit 116 and the proficiency storage unit 117.

The activation order storage unit 116 stores identification information about a following printer NX. The following printer NX refers to a printer 1 that is activated subsequently to the first printer 1A. In the present exemplary embodiment, the following printer NX corresponds to the second printer 1B, for example.

When the designation reception unit 112 receives designation of the following printer NX, the designation reception unit 112 causes the activation order storage unit 116 to store identification information about the following printer NX that is received.

The activation order storage unit 116 corresponds to one example of an "activation order storage region".

The following printer NX corresponds to one example of a "following printing apparatus".

The proficiency storage unit 117 stores proficiency information in which proficiency UM of the operator and a first maintenance time TM1 are associated with each other. The first maintenance time TM1 indicates a time required for a maintenance operation executed after executing an initial operation. For example, the maintenance operation executed after executing the initial operation includes setting of a printing medium in the printing medium accommodation unit 18 and nozzle check of the printing head 161.

As the operator proficiency UM is higher, the first maintenance time TM1 is shorter. For example, when the operator is a beginner, the first maintenance time TM1 is four minutes. When the operator is a skilled person, the first maintenance time TM1 is two minutes.

The activation instruction reception unit 111 receives an activation instruction from the operator via the printer input unit 14. For example, when the printer input unit 14 includes an activation button, and pressing of the activation button by the operator is received, the activation instruction reception unit 111 receives the activation instruction from the operator.

The designation reception unit 112 receives designation of the following printer NX from the operator via the printer input unit 14. For example, a following printer input screen is displayed on the touch panel of the printer input unit 14, and designation of the following printer NX is received based on a touch operation by the operator on the following printer input screen.

For example, an image indicating the second printer 1B and an image indicating the third printer 1C are displayed on the following printer input screen. When the operator touches the image indicating the second printer 1B, the designation reception unit 112 receives designation of the following printer NX as the second printer 1B. When the operator touches the image indicating the third printer 1C, the designation reception unit 112 receives designation of the following printer NX as the third printer 1C.

The operator reception unit 113 receives designation of the proficiency UM of the operator who executes the maintenance operation. The operator reception unit 113 causes the proficiency storage unit 117 to store the operator proficiency UM, which is received by the operator reception unit 113, as proficiency information associated with the first maintenance time TM1.

The clocking unit 114 measures a first elapsed time TQ1 from the timing at which the activation instruction reception unit 111 receives an activation instruction from the operator.

When the second printer 1B is designated as the following printer NX to be activated subsequently to the first printer 1A, the activation control unit 115 executes activation instruction processing for outputting an activation instruction to the second printer 1B.

Specifically, in the activation instruction processing, the activation control unit 115 outputs an activation instruction to the second printer 1B at second activation timing obtained based on, with the timing at which the first printer 1A receives the activation instruction as a starting point, a first initial operation time TP1 required for the initial operation of the first printer 1A, the first maintenance time TM1 required for the maintenance operation executed after the first printer 1A executes the initial operation, and a second initial operation time TP2 required for the initial operation of the second printer 1B.

More specifically, when the second printer 1B is designated as the following printer NX, the activation control unit 115 obtains, based on Equation (1) given below, a first activation time difference TS1 from the timing at which the first printer 1A receives the activation instruction to the second activation timing. Further, when the first elapsed time TQ1 reaches the first activation time difference TS1, the activation control unit 115 outputs an activation instruction to the second printer 1B.

$$TS1 = TP1 + TM1 - TP2 \quad (1)$$

Note that the first initial operation time TP1 indicates a time required for the initial operation of the first printer 1A. The first maintenance time TM1 indicates a time required for the maintenance operation executed after the first printer 1A executes the initial operation. The second initial operation time TP2 indicates a time required for the initial operation of the second printer 1B.

Further, Equation (1) is the same as "Equation (A)".

In the present exemplary embodiment, each of the first initial operation time TP1 and the second initial operation time TP2 is three minutes, for example.

Further, at the time of obtaining the first activation time difference TS1, when the first elapsed time TQ1 is equal to or greater than the first activation time difference TS1, the activation control unit 115 outputs the activation instruction to the second printer 1B.

Further, when the activation instruction reception unit 111 receives the activation instruction from the operator, the activation control unit 115 executes the initial operation, and shifts the first printer 1A to a printable state.

Next, description is made on how functional blocks included in the printer control unit 11 of the second printer 1B are different from the functional blocks included in the printer control unit 11 of the first printer 1A.

In the printer control unit 11 of the second printer 1B, the activation order storage unit 116 stores identification information about the printer 1 that is activated subsequently to the second printer 1B, as identification information about the following printer NX. In the present exemplary embodiment, the following printer NX corresponds to the third printer 1C, for example.

Further, in the printer control unit 11 of the second printer 1B, the activation instruction reception unit 111 receives the activation instruction from the activation control unit 115 of the first printer 1A via the printer communication unit 12.

Further, in the printer control unit 11 of the second printer 1B, the operator reception unit 113 receives the operator proficiency UM from the activation control unit 115 of the first printer 1A via the printer communication unit 12. Further, the operator reception unit 113 causes the proficiency storage unit 117 to store the proficiency as proficiency information associated with a second maintenance time TM2.

Further, in the printer control unit 11 of the second printer 1B, the clocking unit 114 measures a second elapsed time TQ2 from the timing at which the activation instruction reception unit 111 receives the activation instruction from the activation control unit 115 of the first printer 1A via the printer communication unit 12.

Further, in the printer control unit 11 of the second printer 1B, the activation control unit 115 outputs an activation instruction to the third printer 1C at third activation timing obtained based on, with the timing at which the second printer 1B receives the activation instruction as a starting point, the second initial operation time TP2 required for the initial operation of the second printer 1B, the second maintenance time TM2 required for the maintenance operation executed after the second printer 1B executes the initial operation, and a third initial operation time TP3 required for the initial operation of the third printer 1C.

Specifically, when the third printer 1C is designated as the following printer NX, the activation control unit 115 obtains, based on Equation (2) given below, a second activation time difference TS2 from the timing at which the second printer 1B receives the activation instruction to the third activation timing. Further, when the second elapsed time TQ2 reaches the second activation time difference TS2, the activation control unit 115 outputs an activation instruction to the third printer 1C.

$$TS2 = TP2 + TM2 - TP3 \quad (2)$$

Note that the second initial operation time TP2 indicates a time required for the initial operation of the second printer 1B. The second maintenance time TM2 indicates a time required for the maintenance operation executed after the second printer 1B executes the initial operation. The third initial operation time TP3 indicates a time required for the initial operation of the third printer 1C.

In the present exemplary embodiment, the third initial operation time TP3 is three minutes, for example.

Further, in the printer control unit 11 of the second printer 1B, at the time of obtaining the second activation time difference TS2, when the second elapsed time TQ2 is equal to or greater than the second activation time difference TS2, the activation control unit 115 outputs the activation instruction to the third printer 1C.

Further, in the printer control unit 11 of the second printer 1B, when the activation instruction reception unit 111 receives the activation instruction from the first printer 1A, the activation control unit 115 executes the initial operation, and shifts the second printer 1B to a printable state.

Next, description is made on how functional blocks included in the printer control unit 11 of the third printer 1C are different from the functional blocks included in the printer control unit 11 of the second printer 1B.

In the printer control unit 11 of the third printer 1C, the activation order storage unit 116, the proficiency storage unit 117, the designation reception unit 112, the operator reception unit 113, and the clocking unit 114 are not operated.

In the printer control unit 11 of the third printer 1C, the activation instruction reception unit 111 receives the activation instruction from the activation control unit 115 of the second printer 1B via the printer communication unit 12.

In the printer control unit 11 of the third printer 1C, when the activation instruction reception unit 111 receives the activation instruction from the second printer 1B, the activation control unit 115 executes the initial operation, and shifts the third printer 1C to a printable state.

Figure 2:
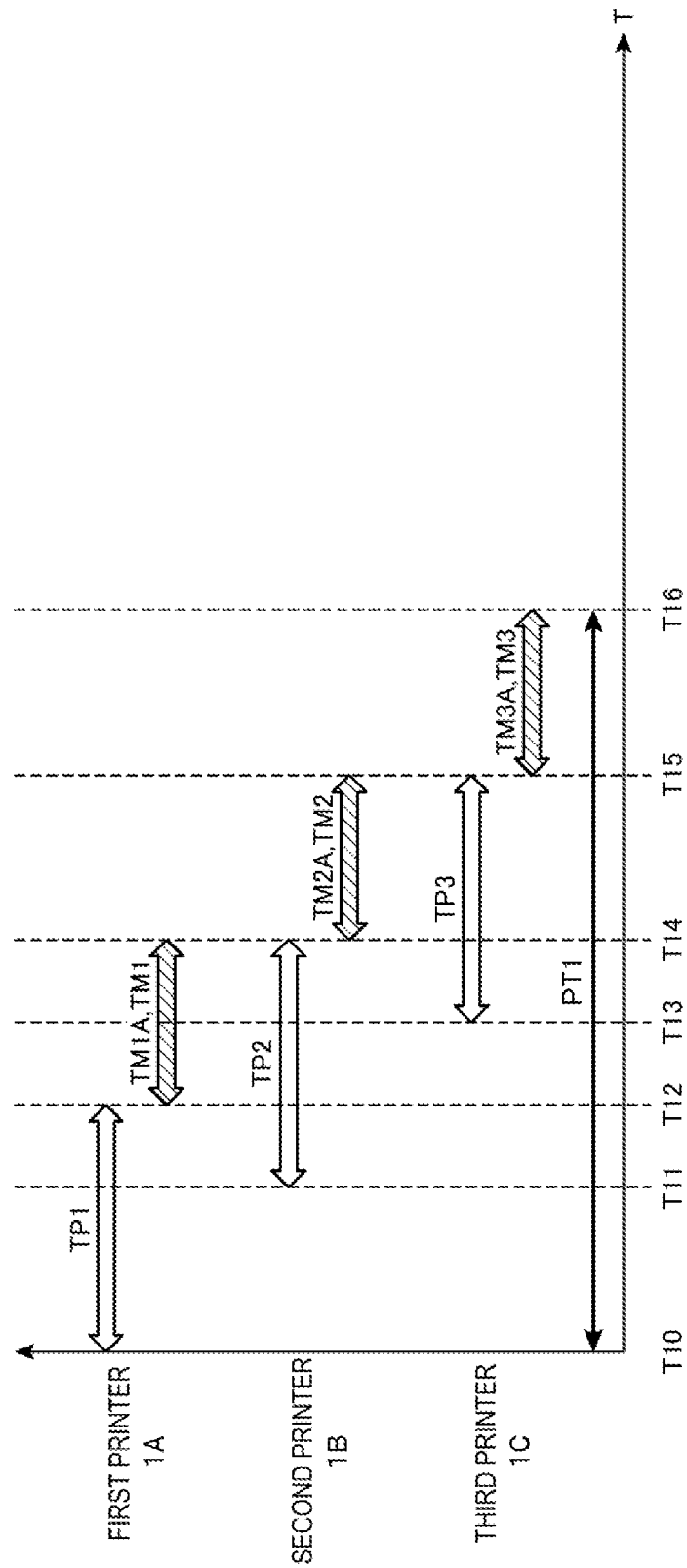
FIG. 2 is a timing chart illustrating one example of operations of the printing system.
Figure 3:
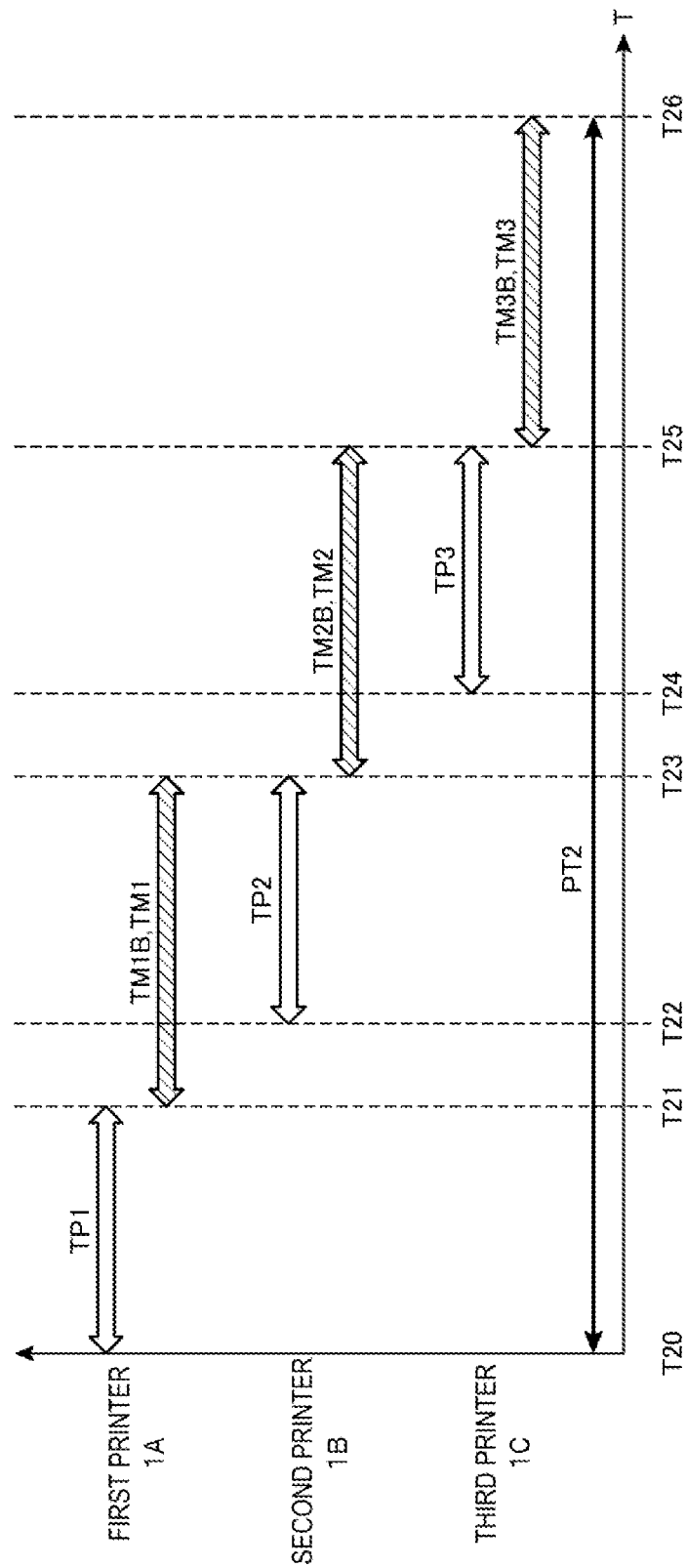
FIG. 3 is a timing chart illustrating another example of the operations of the printing system.

Next, with reference to FIG. 2 and FIG. 3, one example of operations of the first printer 1A, the second printer 1B, and the third printer 1C is described.

The horizontal axes in FIG. 2 and FIG. 3 indicate a time T.

FIG. 2 is a timing chart illustrating one example of operations of the printing system 100A. In FIG. 2, description is given assuming that the operator is a skilled person. Specifically, each of the first maintenance time TM1, the second maintenance time TM2, and a third maintenance time TM3 is two minutes, for example. In this case, the first maintenance time TM1, the second maintenance time TM2, and the third maintenance time TM3 are denoted as a first maintenance time TM1A, a second maintenance time TM2A, and a third maintenance time TM3A, respectively.

Further, each of the first initial operation time TP1, the second initial operation time TP2, and the third initial operation time TP3 is three minutes, for example. In view of this, the first activation time difference TS1 and the second activation time difference TS2 are calculated to be two minutes (=three minutes+two minutes−three minutes) based on Equation (1) and Equation (2), respectively.

As illustrated in FIG. 2, at a time T10, the first printer 1A receives the activation instruction from the operator, and starts execution of the initial operation. Further, the first printer 1A starts measurement of the first elapsed time TQ1.

Subsequently, at a time T11, the first printer 1A determines that the first elapsed time TQ1 reaches the first activation time difference TS1, and outputs the activation instruction to the second printer 1B. Then, the second printer 1B starts execution of the initial operation. Further, the second printer 1B starts measurement of the second elapsed time TQ2.

The time T11 corresponds to one example of the "second activation timing".

Subsequently, at a time T12, the first printer 1A completes the initial operation, and is shifted to a printable state. Further, in the first printer 1A, the maintenance operation by the operator is started.

The period from the time T10 to the time T12 corresponds to the first initial operation time TP1.

Subsequently, at a time T13, the second printer 1B determines that the second elapsed time TQ2 reaches the second activation time difference TS2, and outputs the activation instruction to the third printer 1C. Then, the third printer 1C starts execution of the initial operation.

The time T13 corresponds to one example of the "third activation timing".

Subsequently, at a time 114, in the first printer 1A, the maintenance operation by the operator is terminated. Further, the second printer 1B completes the initial operation, and is shifted to a printable state. Further, in the second printer 1B, the maintenance operation by the operator is started.

The period from the time T11 to the time 114 corresponds to the second initial operation time TP2. The period from the time T12 to the time 114 corresponds to the first maintenance time TM1A.

Subsequently, at a time T15, in the second printer 1B, the maintenance operation by the operator is terminated. Further, the third printer 1C completes the initial operation, and is shifted to a printable state. Further, in the third printer 1C, the maintenance operation by the operator is started.

The period from the time T13 to the time T15 corresponds to the third initial operation time TP3. The period from the time 114 to the time T15 corresponds to the second maintenance time TM2A.

Subsequently, at a time T16, in the third printer 1C, the maintenance operation by the operator is terminated.

The period from the time T15 to the time T16 corresponds to the third maintenance time TM3A.

As illustrated in FIG. 2, in the first printer 1A, the second printer 1B, and the third printer 1C, a total time PT1 required for completing the initial operations and completing the maintenance operations is nine minutes. As described later with reference to FIG. 10, in a related-art printing system 100C, in the second printer 1B, and the third printer 1C, a total time PT3 required for completing the initial operations and completing the maintenance operations is fifteen minutes.

Therefore, as compared to the related-art printing system 100C, the time required for completing the initial operations and completing the maintenance operations can be shortened in the first printer 1A, the second printer 1B, and the third printer 1C.

Figure 10:
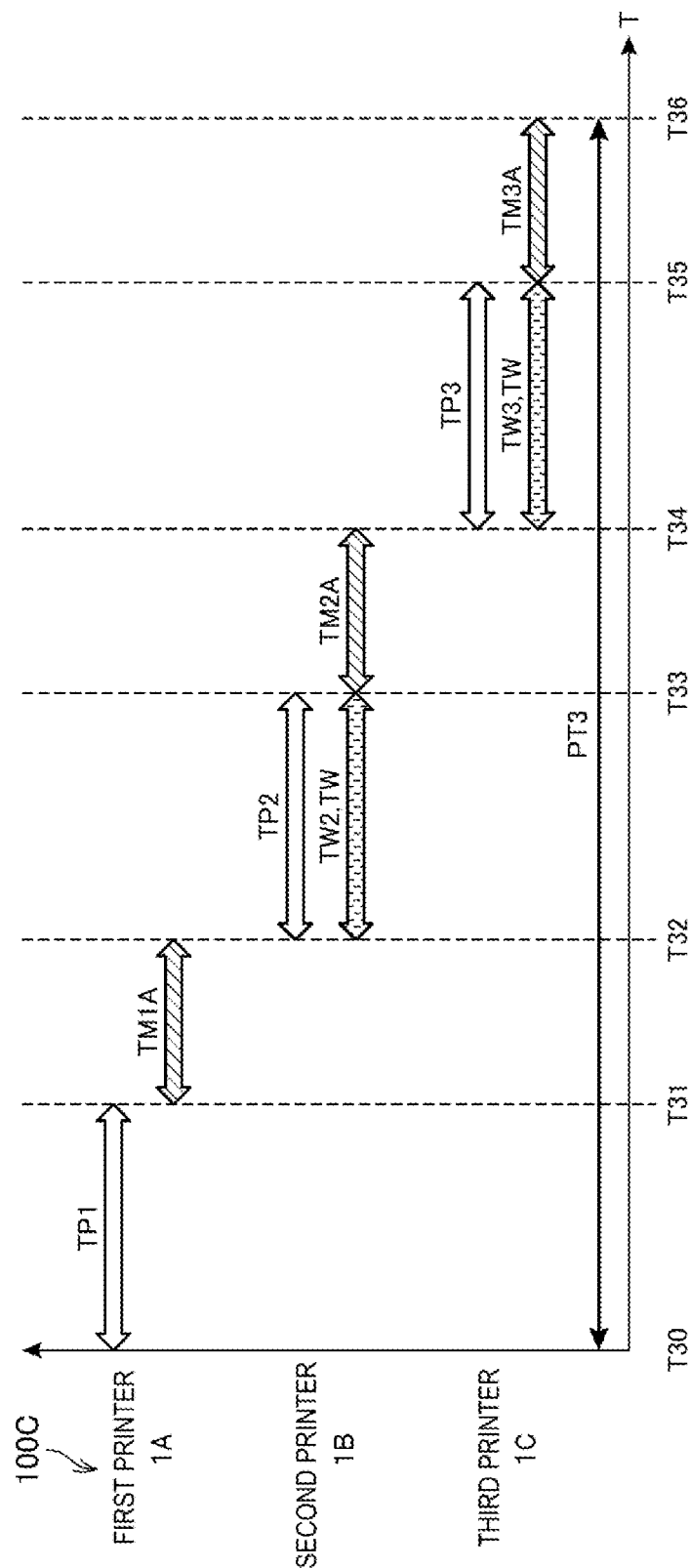
FIG. 10 is a timing chart illustrating one example of operations of a related-art printing system.

Next, with reference to FIG. 10, operations of the related-art printing system 100C are described.

The related-art printing system 100C includes the first printer 1A, the second printer 1B, and the third printer 1C. However, in the related-art printing system 100C, the printer control unit 11 of each of the first printer 1A, the second printer 1B, and the third printer 1C does not include functional blocks other than the activation instruction reception unit 111 described with reference to FIG. 1. In other words, in the related-art printing system 100C, when the printer input unit 14 receives the activation instruction from the operator, each of the first printer 1A, the second printer 1B, and the third printer 1C executes the initial operation, and is shifted to a printable state.

The horizontal axis in FIG. 10 indicates the time T. FIG. 10 is a timing chart illustrating one example of operations of the related-art printing system 100C. In FIG. 10, description is given assuming that the operator is a skilled person. Specifically, each of the first maintenance time TM1A, the second maintenance time TM2A, and the third maintenance time TM3A is two minutes, for example.

As illustrated in FIG. 10, at a time T30, the first printer 1A receives the activation instruction from the operator, and starts execution of the initial operation.

Subsequently, at a time T31, the first printer 1A completes the initial operation, and is shifted to a printable state. Further, in the first printer 1A, the maintenance operation by the operator is started.

The period from the time T30 to the time T31 corresponds to the first initial operation time TP1.

Subsequently, at a time T32, the first printer 1A terminates the maintenance operation by the operator, and the second printer 1B receives the activation instruction from the operator, and starts execution of the initial operation.

The period from the time T31 to the time T32 corresponds to the first maintenance time TM1A. Subsequently, at a time T33, the second printer 1B completes the initial operation, and is shifted to a printable state. Further, in the second printer 1B, the maintenance operation by the operator is started.

The period from the time T32 to the time T33 corresponds to the second initial operation time TP2.

Subsequently, at a time T34, the second printer 1B terminates the maintenance operation by the operator, and the third printer 1C receives the activation instruction from the operator, and starts execution of the initial operation.

The period from the time T33 to the time T34 corresponds to the second maintenance time TM2A. Subsequently, at a time T35, the third printer 1C completes the initial operation, and is shifted to a printable state. Further, in the third printer 1C, the maintenance operation by the operator is started.

The period from the time T34 to the time T35 corresponds to the third initial operation time TP3.

Subsequently, at a time T36, the third printer 1C terminates the maintenance operation by the operator.

The period from the time T35 to the time T36 corresponds to the third maintenance time TM3A.

Further, as illustrated in FIG. 10, a waiting time TW2 is generated for the operator in the period from the time T32 to the time T33, and a waiting time TW3 is generated for the operator in the period from the time T34 to the time T35. Each of the waiting time TW2 and the waiting time TW3 is three minutes. Therefore, in the related-art printing system 100C, the waiting time TW2 and the waiting time TW3 are generated. Thus, the total time PT3 required for completing the initial operations and completing the maintenance operations in the first printer 1A, the second printer 1B, and the third printer 1C is fifteen minutes, which is longer than the total time PT1 illustrated in FIG. 2 by six minutes.

In the following description, when there is no need to distinguish the waiting time TW2 and the waiting time TW3 from each other, the term "waiting time TW" is used in some cases.

Based on the comparison between FIG. 10 and FIG. 2, the waiting time TW is not generated for the operator in the printing system 100A according to the first exemplary embodiment, which can improve user workability.

Figure 11:
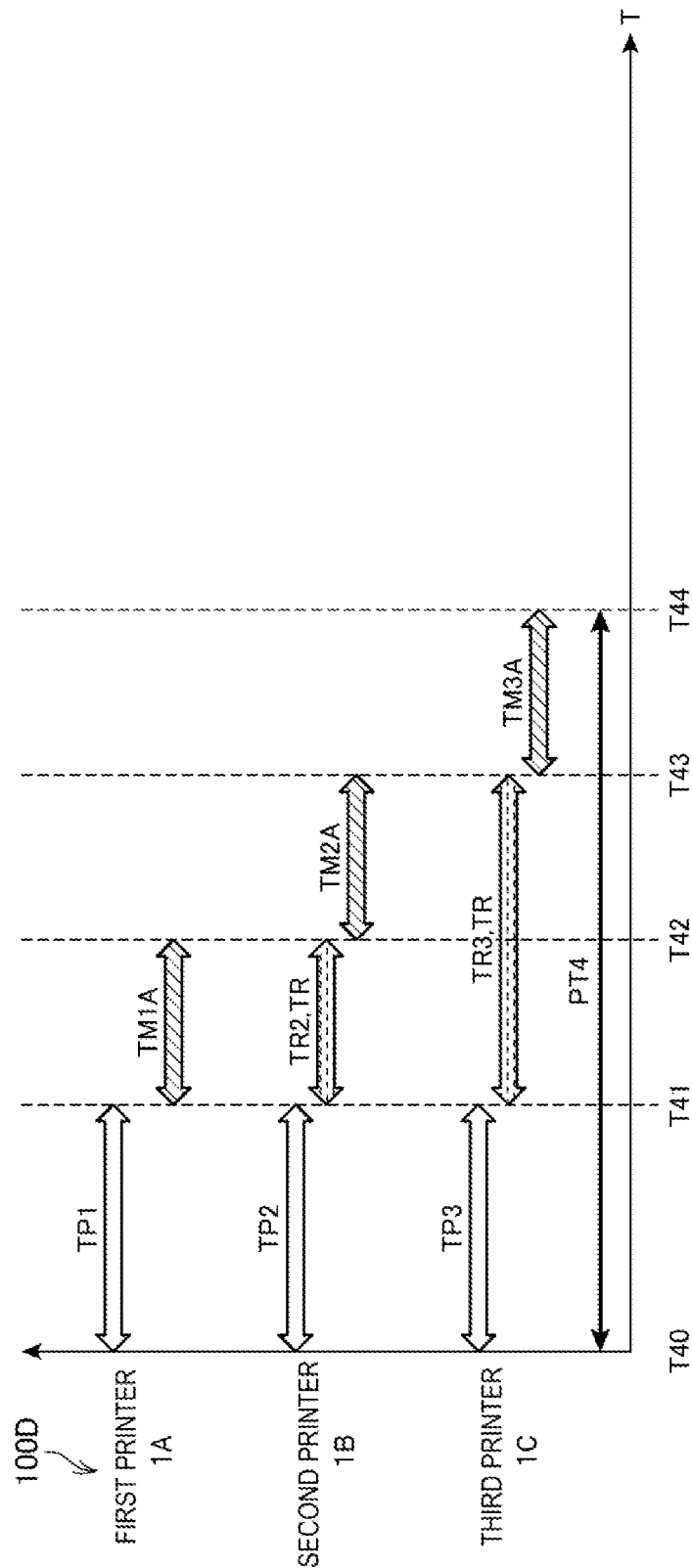
FIG. 11 is a timing chart illustrating another example of operations of a related-art printing system.

Next, with reference to FIG. 11, operations of a related-art printing system 100D are described.

The related-art printing system 100D includes the first printer 1A, the second printer 1B, and the third printer 1C.

However, in the related-art printing system 100D, the printer control unit 11 of each of the first printer 1A, the second printer 1B, and the third printer 1C does not include functional blocks other than the activation instruction reception unit 111 described with reference to FIG. 1. In other words, in the related-art printing system 100D, when the printer input unit 14 receives the activation instruction from the operator, each of the first printer 1A, the second printer 1B, and the third printer 1C executes the initial operation, and is shifted to a printable state.

The horizontal axis in FIG. 11 indicates the time T. FIG. 11 is a timing chart illustrating one example of operations of the related-art printing system 100D. In FIG. 11, description is given assuming that the operator is a skilled person. Specifically, each of the first maintenance time TM1A, the second maintenance time TM2A, and the third maintenance time TM3A is two minutes, for example.

The printing system 100D illustrated in FIG. 11 is different from the printing system 100C illustrated in FIG. 10 in that the operator simultaneously activates the first printer 1A, the second printer 1B, and the third printer 1C.

As illustrated in FIG. 11, at a time T40, each of the first printer 1A, the second printer 1B, and the third printer 1C receives the activation instruction from the operator, and starts execution of the initial operation.

Subsequently, at a time T41, each of the first printer 1A, the second printer 1B, and the third printer 1C completes the initial operation, and is shifted to a printable state. Further, in the first printer 1A, the maintenance operation by the operator is started.

The period from the time T40 to the time 141 corresponds to the first initial operation time TP1, the second initial operation time TP2, and the third initial operation time TP3.

Subsequently, at a time T42, the first printer 1A terminates the maintenance operation by the operator, the second printer 1B starts the maintenance operation by the operator.

The period from the time T41 to the time 142 corresponds to the first maintenance time TM1A. Subsequently, at a time T43, the second printer 1B terminates the maintenance operation by the operator, and the third printer 1C starts the maintenance operation by the operator.

The period from the time T42 to the time T43 corresponds to the second maintenance time TM2A. Subsequently, at a time T44, the third printer 1C terminates the maintenance operation by the operator.

The period from the time T43 to the time T44 corresponds to the third maintenance time TM3A.

Further, as illustrated in FIG. 11, a power consumption period TR2 during which excessive power consumption is caused is generated in the second printer 1B in the period from the time T41 to the time T42, and a power consumption period TR3 during which excessive power consumption is caused is generated in the third printer 1C in the period from the time T41 to the time T43. Therefore, in the second printer 1B and the third printer 1C, lifetimes of the consumables are shortened.

In the following description, when there is no need to distinguish the power consumption period TR2 and the power consumption period TR3 from each other, the term "power consumption period TR" is used in some cases.

Based on the comparison between FIG. 11 and FIG. 2, the power consumption period TR can be suppressed in the printing system 100A according to the first exemplary embodiment, which can suppress reduction of lifetimes of the consumables in the printer 1.

FIG. 3 is a timing chart illustrating another example of the operations of the printing system 100A. In FIG. 3, description is given assuming that the operator is a beginner. Specifically, each of the first maintenance time TM1, the second maintenance time TM2, and the third maintenance time TM3 is four minutes, for example. In this case, the first maintenance time TM1, the second maintenance time TM2, and the third maintenance time TM3 are denoted as a first maintenance time TM1B, a second maintenance time TM2B, and a third maintenance time TM3B, respectively.

Further, each of the first initial operation time TP1, the second initial operation time TP2, and the third initial operation time TP3 is three minutes, for example. In view of this, the first activation time difference TS1 and the second activation time difference TS2 are calculated to be four minutes (=three minutes+four minutes−three minutes) based on Equation (1) and Equation (2), respectively.

As illustrated in FIG. 3, at a time T20, the first printer 1A receives the activation instruction from the operator, and starts execution of the initial operation. Further, the first printer 1A starts measurement of the first elapsed time TQ1.

Subsequently, at a time T21, the first printer 1A completes the initial operation, and is shifted to a printable state. Further, in the first printer 1A, the maintenance operation by the operator is started.

The period from the time T20 to the time T21 corresponds to the first initial operation time TP1.

Subsequently, at a time T22, the first printer 1A determines that the first elapsed time TQ1 reaches the first activation time difference TS1, and outputs the activation instruction to the second printer 1B. Then, the second printer 1B starts execution of the initial operation. Further, the second printer 1B starts measurement of the second elapsed time TQ2.

The time T22 corresponds to one example of the "second activation timing.

Subsequently, at a time T23, in the first printer 1A, the maintenance operation by the operator is terminated. Further, the second printer 1B completes the initial operation, and is shifted to a printable state. Further, in the second printer 1B, the maintenance operation by the operator is started.

The period from the time T21 to the time T23 corresponds to the first maintenance time TM1B. Further, the period from the time T22 to the time T23 corresponds to the second initial operation time TP2.

Subsequently, at a time T24, the second printer 1B determines that the second elapsed time TQ2 reaches the second activation time difference TS2, and outputs the activation instruction to the third printer 1C. Then, the third printer 1C starts execution of the initial operation.

The time T24 corresponds to one example of the "third activation timing".

Subsequently, at a time T25, in the second printer 1B, the maintenance operation by the operator is terminated. Further, the third printer 1C completes the initial operation, and is shifted to a printable state. Further, in the third printer 1C, the maintenance operation by the operator is started.

The period from the time T23 to the time T25 corresponds to the second maintenance time TM2B. Further, the period from the time T24 to the time T25 corresponds to the third initial operation time TP3.

Subsequently, at a time T26, in the third printer 1C, the maintenance operation by the operator is terminated.

The period from the time T24 to the time T26 corresponds to the third maintenance time TM3B.

As illustrated in FIG. 3, the first printer 1A, the second printer 1B, and the third printer 1C, a total time PT2 required for completing the initial operations and completing the maintenance operations is fifteen minutes.

In the following description, when there is no need to distinguish the total time PT1, the total time PT2, the total time PT3, and a total time PT4 from one another, the term "total time PT" is used in some cases.

As illustrated in FIG. 2 and FIG. 3, even when the operator is a skilled person or when the operator is a beginner, the second printer 1B and the third printer 1C are activated at appropriate timing, and hence the waiting time TW for the operator is not generated. Therefore, as compared to the related-art printing system 100C, the total time PT required for completing the initial operations and completing the maintenance operations can be shortened in the first printer 1A, the second printer 1B, and the third printer 1C.

Figure 4:
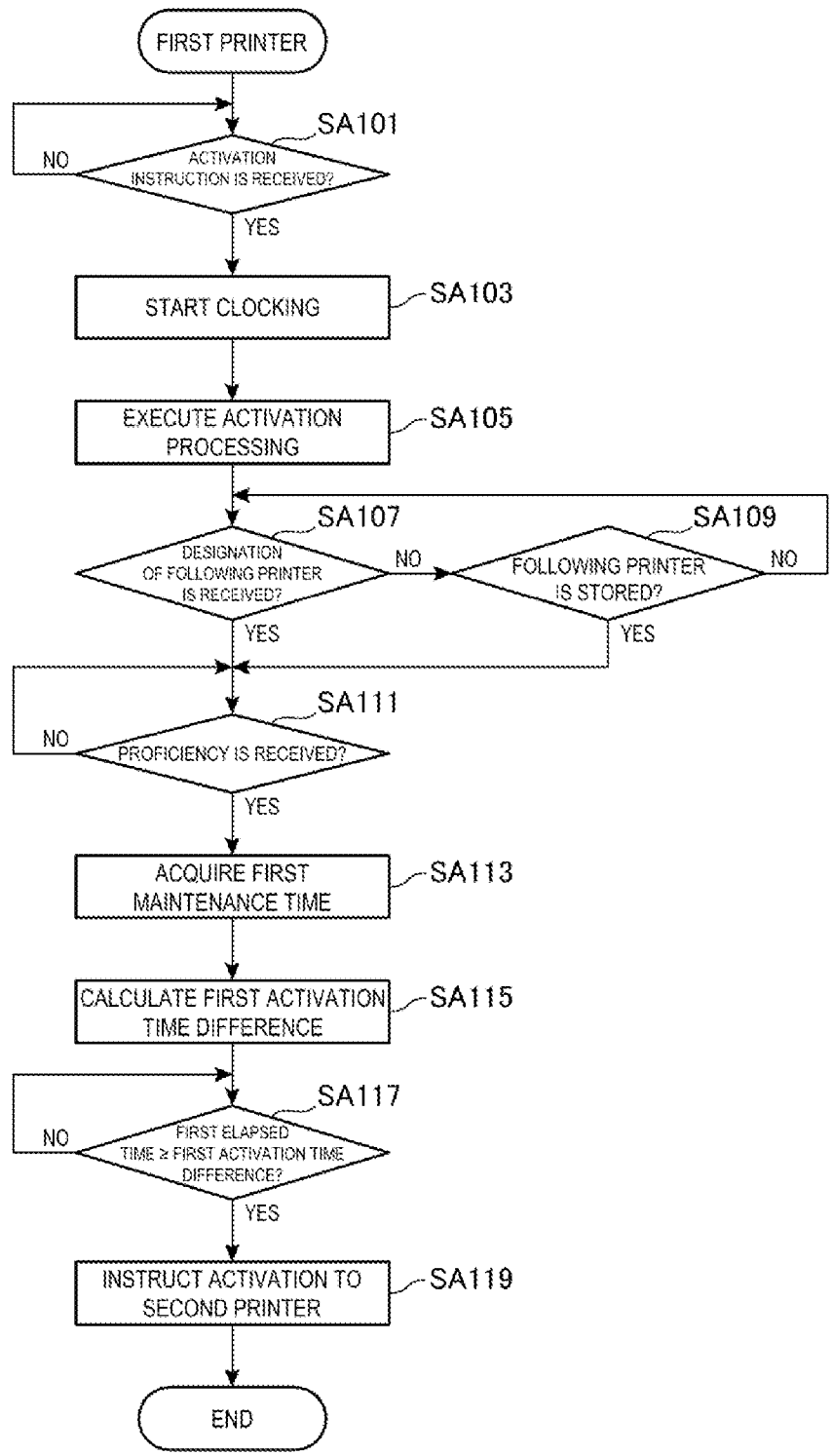
FIG. 4 is a flowchart illustrating one example of processing of a printer control unit of a first printer.
Figure 5:
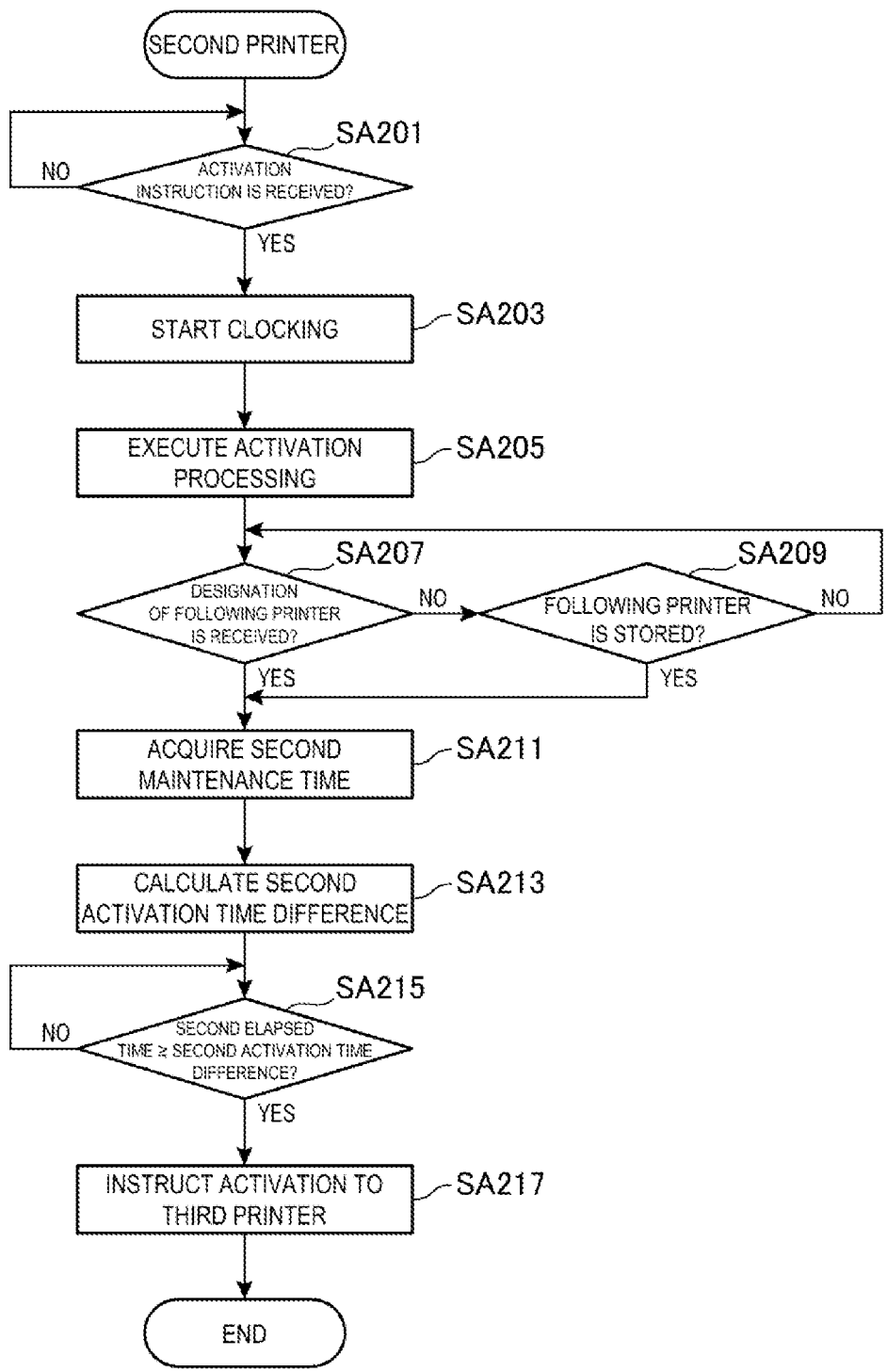
FIG. 5 is a flowchart illustrating one example of processing of a printer control unit of a second printer.
Figure 6:
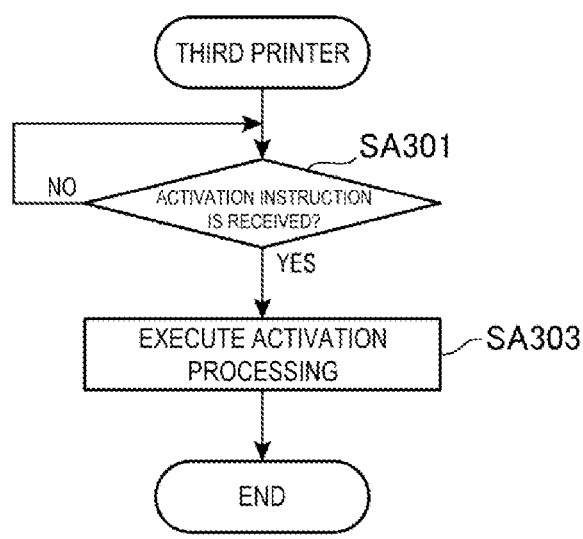
FIG. 6 is a flowchart illustrating one example of processing of a printer control unit of a third printer.

Next, with reference to FIG. 4 to FIG. 6, processing of the printer control unit 11 of the first printer 1A, the printer control unit 11 of the second printer 1B, and the printer control unit 11 of the third printer 1C is described.

FIG. 4 is a flowchart illustrating one example of processing of the printer control unit 11 of the first printer 1A.

As illustrated in FIG. 4, first, in Step SA101, the activation instruction reception unit 111 determines whether the activation instruction is received from the operator.

When the activation instruction reception unit 111 determines that the activation instruction is not received from the operator (NO in Step SA101), the processing is in a standby state. When the activation instruction reception unit 111 determines that the activation instruction is received from the operator (YES in Step SA101), the processing proceeds to Step SA103.

Then, in Step SA103, the clocking unit 114 starts measurement of the first elapsed time TQ1.

Subsequently, in Step SA105, the activation control unit 115 starts execution of the initial operation.

Subsequently, in Step SA107, the designation reception unit 112 determines whether designation of the following printer NX is received from the operator.

When the designation reception unit 112 determines that designation of the following printer NX is received from the operator (YES in Step SA107), the processing proceeds to Step SA111. When the designation reception unit 112 determines that designation of the following printer NX is not received from the operator (NO in Step SA107), the processing proceeds to Step SA109.

Further, in Step SA109, the printer control unit 11 determines whether the activation order storage unit 116 stores the identification information about the following printer NX.

When the printer control unit 11 determines that the activation order storage unit 116 does not store the identification information about the following printer NX (NO in Step SA109), the processing returns to Step SA107. When the printer control unit 11 determines that the activation order storage unit 116 stores the identification information about the following printer NX (YES in Step SA109), the processing proceeds to Step SA111.

Then, in Step SA111, the operator reception unit 113 determines whether designation of the proficiency UM of the operator who executes the maintenance operation is received.

When the operator reception unit 113 determines that designation of the proficiency UM is not received (NO in Step SA111), the processing is in a standby state. When the operator reception unit 113 determines that designation of the proficiency UM is received (YES in Step SA111), the processing proceeds to Step SA113.

Then, in Step SA113, the activation control unit 115 acquires the first maintenance time TM1 from the proficiency storage unit 117.

Subsequently, in Step SA115, the activation control unit 115 calculates the first activation time difference TS1 from Equation (1) given above.

Subsequently, in Step SA117, the activation control unit 115 determines whether the first elapsed time TQ1 is equal to or greater than the first activation time difference TS1.

When the activation control unit 115 determines that the first elapsed time TQ1 is not equal to or greater than the first activation time difference TS1 (NO in Step SA117), the processing is in a standby state. When the activation control unit 115 determines that the first elapsed time TQ1 is equal to or greater than the first activation time difference TS1 (YES in Step SA117), the processing proceeds to Step SA119.

Then, in Step SA119, the activation control unit 115 outputs the activation instruction to the second printer 1B. Further, the operator reception unit 113 outputs the information indicating the operator proficiency UM to the second printer 1B. Then, the processing is terminated.

As described with reference to FIG. 4, when the first elapsed time TQ1 is equal to or greater than the first activation time difference TS1, the activation control unit 115 of the first printer 1A outputs the activation instruction to the second printer 1B. Therefore, as described with reference to FIG. 2 and FIG. 3, the activation instruction can be output to the second printer 1B at appropriate timing.

FIG. 5 is a flowchart illustrating one example of processing of the printer control unit 11 of the second printer 1B.

As illustrated in FIG. 5, in Step SA201, the activation instruction reception unit 111 determines whether the activation instruction is received from the first printer 1A.

When the activation instruction reception unit 111 determines that the activation instruction is not received from the first printer 1A (NO in Step SA201), the processing is in a standby state. When the activation instruction reception unit 111 determines that the activation instruction is received from the first printer 1A (YES in Step SA201), the processing proceeds to Step SA203. Note that, when the activation instruction reception unit 111 determines that the activation instruction is received from the first printer 1A, the operator reception unit 113 receives the information indicating the operator proficiency UM from the first printer 1A, and causes the proficiency storage unit 117 to store the information.

Then, in Step SA203, the clocking unit 114 starts measurement of the second elapsed time TQ2.

Subsequently, in Step SA205, the activation control unit 115 starts execution of the initial operation.

Subsequently, in Step SA207, the designation reception unit 112 determines whether designation of the following printer NX is received from the operator.

When the designation reception unit 112 determines that designation of the following printer NX is received from the operator (YES in Step SA207), the processing proceeds to Step SA211. When the designation reception unit 112 determines that designation of the following printer NX is not received from the operator (No in Step SA207), the processing proceeds to Step SA209.

Then, in Step SA209, the printer control unit 11 determines whether the activation order storage unit 116 stores the identification information about the following printer NX.

When the printer control unit 11 determines that the activation order storage unit 116 does not store the identification information about the following printer NX (NO in Step SA209), the processing returns to Step SA207. When the printer control unit 11 determines that the activation order storage unit 116 stores the identification information about the following printer NX (YES in Step SA209), the processing proceeds to Step SA211.

Subsequently, in Step SA211, the activation control unit 115 acquires the second maintenance time TM2 from the proficiency storage unit 117.

Subsequently, in Step SA213, the activation control unit 115 calculates the second activation time difference TS2 from Equation (2) given above.

Subsequently, in Step SA215, the activation control unit 115 determines whether the second elapsed time TQ2 is equal to or greater than the second activation time difference TS2.

When the activation control unit 115 determines that the second elapsed time TQ2 is not equal to or greater than the second activation time difference TS2 (NO in Step SA215), the processing is in a standby state. When the activation control unit 115 determines that the second elapsed time TQ2 is equal to or greater than the second activation time difference TS2 (YES in Step SA215), the processing proceeds to Step SA217.

Then, in Step SA217, the activation control unit 115 outputs the activation instruction to the third printer 1C. Further, the operator reception unit 113 outputs the information indicating the operator proficiency UM to the third printer 1C. Then, the processing is terminated.

As described with reference to FIG. 5, when the second elapsed time TQ2 is equal to or greater than the second activation time difference TS2, the activation control unit 115 of the second printer 1B outputs the activation instruction to the third printer 1C. Therefore, as described with reference to FIG. 2 and FIG. 3, the activation instruction can be output to the third printer 1C at appropriate timing.

FIG. 6 is a flowchart illustrating one example of processing of the printer control unit 11 of the third printer 1C.

As illustrated in FIG. 6, in Step SA301, the activation instruction reception unit 111 determines whether the activation instruction is received from the second printer 1B.

When the activation instruction reception unit 111 determines that the activation instruction is not received from the second printer 1B (NO in Step SA301), the processing is in a standby state. When the activation instruction reception unit 111 determines that the activation instruction is received from the second printer 1B (YES in Step SA301), the processing proceeds to Step SA303.

Then, in Step SA303, the activation control unit 115 starts execution of the initial operation. Then, after terminating execution of the initial operation, the processing is terminated.

As described above with reference to FIG. 1 to FIG. 6, FIG. 10, and FIG. 11, the printing system 100A according to the first exemplary embodiment includes the first printer 1A configured to execute the initial operation to transition to a printable state when receiving the activation instruction and the second printer 1B configured to execute the initial operation to transition to a printable state when receiving the activation instruction. When the second printer 1B is designated as the following printer NX to be activated subsequently to the first printer 1A, the activation instruction processing of outputting the activation instruction to the second printer 1B is executed. In the activation instruction processing, the activation instruction is output to the second printer 1B at the second activation timing obtained based on, with the timing at which the first printer 1A receives the activation instruction as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B.

With this configuration, the activation instruction is output to the second printer 1B at the second activation timing obtained based on the first initial operation time TP1, the first maintenance time TM1, and the second initial operation time TP2 with the timing at which the first printer 1A receives the activation instruction as a starting point. Thus, the second printer 1B can be activated at appropriate timing. Therefore, generation of the waiting time TW for the operator can be suppressed. Further, generation of the power consumption period TR during which excessive power consumption is caused can be suppressed, and hence reduction of lifetimes of the consumables can be suppressed.

Further, in the printing system 100A, the first printer 1A includes the activation instruction reception unit 111 configured to receive the activation instruction, the designation reception unit 112 configured to receive designation of the following printer NX, the clocking unit 114 configured to measure the first elapsed time TQ1 from the timing at which the first printer 1A receives the activation instruction, and the activation control unit 115 configured to execute the activation instruction processing. When the second printer 1B is designated as the following printer NX, the activation control unit 115 calculates the first activation time difference TS1 from the timing at which the first printer 1A receives the activation instruction to the second activation timing from Equation (A) given below. When the first elapsed time TQ1 reaches the first activation time difference TS1, the activation control unit 115 outputs the activation instruction to the second printer 1B.

$$TS1 = TP1 + TM1 - TP2 \quad (A)$$

In Equation (A), TP1 indicates the first initial operation time, TM1 indicates the first maintenance time, TP2 indicates the second initial operation time, and TS1 indicates the first activation time difference.

With this configuration, when the second printer 1B is designated as the following printer NX, the first activation time difference TS1 from the timing at which the first printer 1A receives the activation instruction to the second activation timing is obtained from Equation (A). When the first elapsed time TQ1 reaches the first activation time difference TS1, the activation instruction is output to the second printer 1B. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

Further, in the printing system 100A, at the time of obtaining the first activation time difference TS1, when the first elapsed time TQ1 is equal to or greater than the first activation time difference TS1, the activation control unit 115 outputs the activation instruction to the second printer 1B.

With this configuration, when the first elapsed time TQ1 is equal to or greater than the first activation time difference TS1, the activation instruction is output to the second printer 1B. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

Further, in the printing system 100A, the first printer 1A includes the operator reception unit 113 configured to receive designation of the proficiency UM of the operator who executes the maintenance operation and the proficiency storage unit 117 configured to store the proficiency information in which the operator proficiency UM and the first maintenance time TM1 are associated with each other. The activation control unit 115 acquires the first maintenance time TM1 corresponding to the operator proficiency UM based on the proficiency information, obtains the first activation time difference TS1 based on the acquired first maintenance time TM1.

With this configuration, the first maintenance time TM1 corresponding to the operator proficiency UM is acquired based on the proficiency information. Thus, the first maintenance time TM1 can be determined appropriately. Further, the first activation time difference TS1 is obtained based on the acquired first maintenance time TM1. Thus, the first activation time difference TS1 can be calculated appropriately. Therefore, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

Further, in the printing system 100A, the memory 11B of the first printer 1A includes the activation order storage unit 116 configured to store the information about the following printer NX. When the activation order storage unit 116 stores the information about the following printer NX, and the designation reception unit 112 receives an instruction indicating that designation of the following printer NX is not performed, the activation control unit 115 outputs the activation instruction to the following printer NX stored as the following printer NX in the activation order storage unit 116.

With this configuration, the activation instruction is output to the following printer NX stored as the following printer NX in the activation order storage unit 116. Thus, even when the operator does not perform designation of the following printer NX, the activation instruction can be output to the appropriate following printer NX.

Further, the printing system 100A includes the third printer 1C configured to execute the initial operation to transition to a printable state when receiving the activation instruction. When the third printer 1C is designated as the following printer NX to be activated subsequently to the second printer 1B, the activation instruction processing issues the activation instruction to the third printer 1C. In the activation instruction processing, the activation instruction is output to the third printer 1C at the third activation timing obtained based on, with the timing at which the second printer 1B receives the activation instruction as a starting point, the second initial operation time TP2, the second maintenance time TM2 required for the maintenance operation executed after the second printer 1B executes the initial operation, and the third initial operation time TP3 required for the initial operation of the third printer 1C.

With this configuration, the activation instruction is output to the third printer 1C at the third activation timing obtained based on the second initial operation time TP2, the second maintenance time TM2, and the third initial operation time TP3 with the timing at which the second printer 1B receives the activation instruction as a starting point. Thus, the third printer 1C can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

The first printer 1A according to the first exemplary embodiment is a printer configured to execute the initial operation to transition to a printable state when receiving the activation instruction, and includes the printer communication unit 12 communicably connected to the second printer 1B configured to execute the initial operation to transition to a printable state when the activation instruction, the activation instruction reception unit 111 configured to receive the activation instruction, the designation reception unit 112 configured to receive designation of the following printer NX to be executed subsequently to the first printer 1A, the clocking unit 114 configured to measure the first elapsed time TQ1 from the timing at which the activation instruction is received, and the activation control unit 115 configured to execute the activation instruction processing of outputting the activation instruction to the second printer 1B when the second printer 1B is designated as the following printer NX. In the activation instruction processing, the activation control unit 115 outputs the activation instruction to the second printer 1B at the second activation timing obtained based on, with the timing at which the first printer 1A receives the activation instruction as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B.

With this configuration, the activation instruction is output to the second printer 1B at the second activation timing obtained based on the first initial operation time TP1, the first maintenance time TM1, and the second initial operation time TP2 with the timing at which the first printer 1A receives the activation instruction as a starting point. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

A method of controlling activation of the printer 1 according to the first exemplary embodiment is a method of controlling activation of the printer 1 for activating the first printer 1A configured to execute the initial operation to transition to a printable state when receiving the activation instruction and the second printer 1B configured to execute the initial operation to transition to a printable state when receiving the activation instruction. The activation instruction processing of outputting the activation instruction to the second printer 1B is executed when the second printer 1B is designated as the following printer NX to be activated subsequently to the first printer 1A. In the activation instruction processing, the activation instruction is output to the second printer 1B at the second activation timing obtained based on, with the timing at which the first printer 1A receives the activation instruction as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B.

With this configuration, the activation instruction is output to the second printer 1B at the second activation timing obtained based on the first initial operation time TP1, the first maintenance time TM1, and the second initial operation time TP2 with the timing at which the first printer 1A receives the activation instruction as a starting point. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

Note that description is given assuming that, in the printing system 100A according to the first exemplary embodiment, the first printer 1A, the second printer 1B, and the third printer 1C are communicably connected to one another. However, the printing system 100A according to the first exemplary embodiment is not limited thereto. It is only required that the first printer 1A and the second printer 1B be communicably connected to each other and the second printer 1B and the third printer 1C be communicably connected to each other.

Further, description is given assuming that, in the printing system 100A according to the first exemplary embodiment, the first printer 1A, the second printer 1B, and the third printer 1C are communicably connected to one another via the LAN. However, the printing system 100A according to the first exemplary embodiment is not limited thereto. The first printer 1A, the second printer 1B, and the third printer 1C may be communicably connected to one another via, for example, a WAN. Further, the first printer 1A, the second printer 1B, and the third printer 1C may be communicably connected to one another via, for example, the Internet. Further, the first printer 1A, the second printer 1B, and the third printer 1C may be communicably connected to one another via, for example, a wireless communication.

Further, in the printing system 100A according to the first exemplary embodiment, the first printer 1A outputs the activation instruction to the second printer 1B, and the second printer 1B outputs the activation instruction to the third printer 1C. However, the printing system 100A according to the first exemplary embodiment is not limited thereto.

The first printer 1A may output the activation instruction to each of the second printer 1B and the third printer 1C. In this case, the designation reception unit 112 of the first printer 1A receives, for example, the second printer 1B as the following printer NX subsequent to the first printer 1A, and receives the third printer 1C as the following printer NX subsequent to the second printer 1B. Further, when the second elapsed time TQ2 is equal to or greater than the second activation time difference TS2, the activation control unit 115 of the first printer 1A outputs the activation instruction to the third printer 1C.

In this case, the first printer 1A receives various instructions from the operator, and the second printer 1B and the third printer 1C do not receive an instruction from the operator. Thus, the processing of the second printer 1B and the third printer 1C can be simplified.

Second Exemplary Embodiment

Next, the printing system 100B according to the second exemplary embodiment is described.

Figure 7:
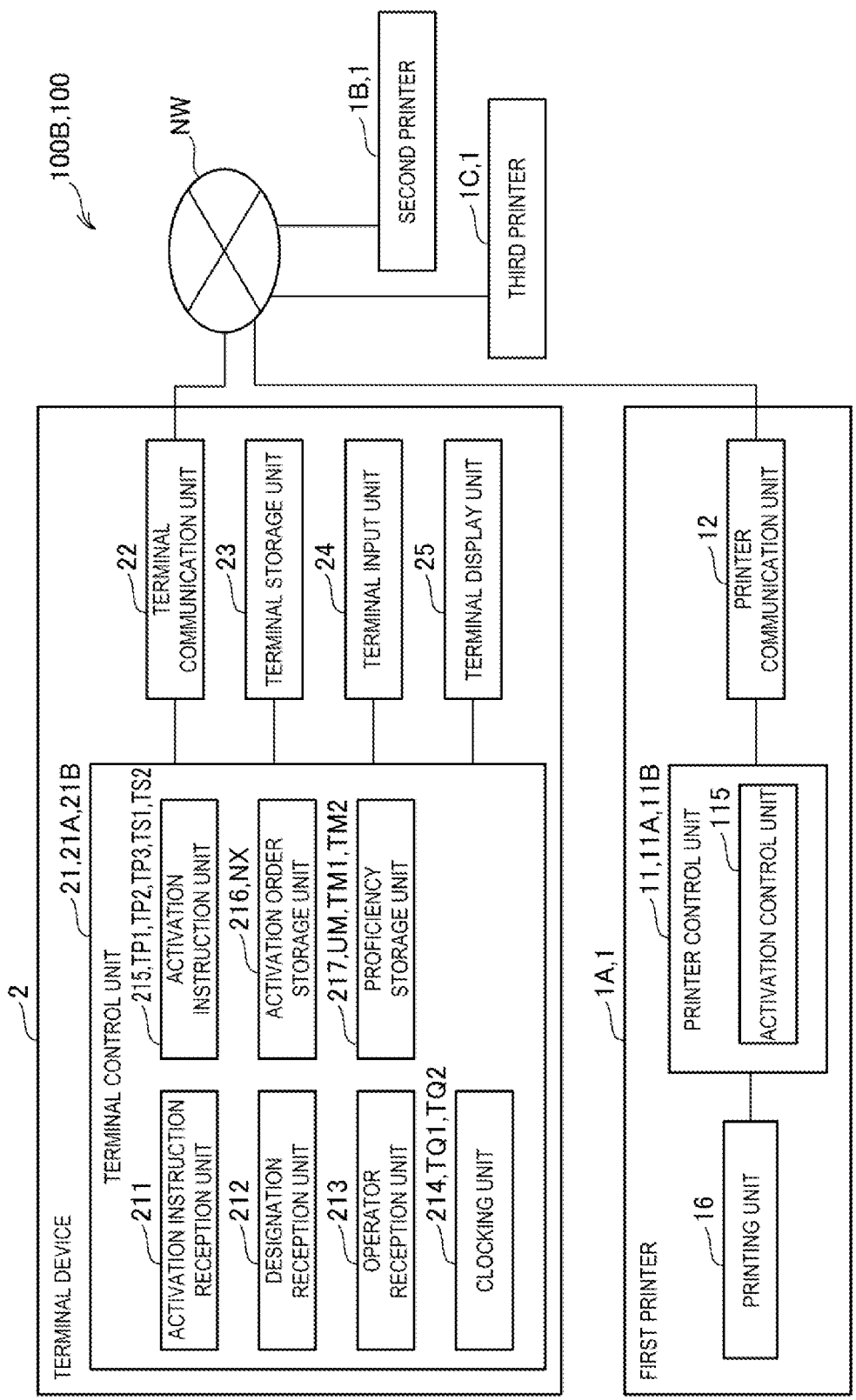
FIG. 7 is a view illustrating one example of a configuration of a printing system according to a second exemplary embodiment.

FIG. 7 is a view illustrating one example of a configuration of the printing system 100B according to the second exemplary embodiment.

Description below is given mainly on how the printing system 100B according to the second exemplary embodiment illustrated in FIG. 7 is different from the printing system 100A according to the first exemplary embodiment illustrated in FIG. 1.

As illustrated in FIG. 7, the printing system 100B includes the printers 1 and a terminal device 2. The printers 1 include the first printer 1A, the second printer 1B, and the third printer 1C.

The first printer 1A, the second printer 1B, the third printer 1C, and the terminal device 2 are communicably connected to one another via the network NW.

Next, the terminal device 2 is described.

As illustrated in FIG. 7, the terminal device 2 includes a terminal control unit 21, a terminal communication unit 22, a terminal storage unit 23, a terminal input unit 24, and a terminal display unit 25. For example, the terminal device 2 is configured as a personal computer.

The terminal device 2 outputs the activation instruction to each of the first printer 1A, the second printer 1B, and the third printer 1C.

The terminal device 2 corresponds to one example of an "activation control device".

The terminal control unit 21 includes a processor 21A such as CPU, a memory 21B such as a ROM and RAM, an ASIC, a signal processing circuit, and the like, and controls each unit of the terminal device 2. The memory 21B stores a control program.

For example, the processor 21A executes processing by reading the control program stored in the memory 21B, the processing is executed by a function mounted to the ASIC, or the processing is executed by executing signal processing in the signal processing circuit. With this, the terminal control unit 21 executes processing by collaboration between hardware and software.

As functional blocks, the terminal control unit 21 includes an activation instruction reception unit 211, a designation reception unit 212, an operator reception unit 213, a clocking unit 214, an activation instruction unit 215, an activation order storage unit 216, and a proficiency storage unit 217. The functional blocks represent, for the sake of convenience, functions as blocks, which are achieved by the processor 11A executing a control program, and do not represent a specific application program and hardware. The functional blocks are described later.

Under control of the terminal control unit 21, the terminal communication unit 22 communicates with the printers 1, specifically, the first printer 1A, the second printer 1B, and the third printer 1C in accordance with a predetermined communication standard.

The terminal storage unit 23 includes a non-volatile memory such as an HDD, an EEPROM, and an SSD, and stores various data in a re-writable manner.

The terminal input unit 24 includes an input means such as an operation switch and a touch panel provided to the terminal device 2, detects an operation of a user with respect to the input means, and outputs, to the terminal control unit 21, a detection signal corresponding to the operation. Based on the input from the terminal input unit 24, the terminal control unit 21 executes processing corresponding to the operation of the user.

The terminal display unit 25 includes a display panel or the like, and executes, for example, information display on the display panel under control of the terminal control unit 21.

Next, the functional blocks of included in the terminal control unit 21 of the terminal device 2 are described. Note that, in the second exemplary embodiment, description is given assuming that the terminal device 2 receives the activation instruction from the operator and sequentially activates the first printer 1A, the second printer 1B, and the third printer 1C.

As functional blocks, the terminal control unit 21 includes the activation instruction reception unit 211, the designation reception unit 212, the operator reception unit 213, the clocking unit 214, the activation instruction unit 215, the activation order storage unit 216, and the proficiency storage unit 217.

Specifically, the processor 21A executes the control program stored in the memory 21B, and thus the activation instruction reception unit 211, the designation reception unit 212, the operator reception unit 213, the clocking unit 214, and the activation instruction unit 215 are realized. Further, the processor 21A executes the control program stored in the memory 21B, and thus causes the memory 21B to function as the activation order storage unit 216 and the proficiency storage unit 217.

The activation order storage unit 216 stores an order in which the printers 1 are activated. When the first printer 1A, the second printer 1B, and the third printer 1C are sequentially activated, the second printer 1B is stored as the following printer NX subsequent to the first printer 1A, and the third printer 1C is stored as the following printer NX subsequent to the second printer 1B.

When the designation reception unit 212 receives designation of the following printer NX, the designation reception unit 212 causes the activation order storage unit 216 to store the received identification information about the following printer NX.

The proficiency storage unit 217 stores the operator proficiency UM and the proficiency information in which the first maintenance time TM1 and the second maintenance time TM2 are associated with each other. The first maintenance time TM1 indicates the time required for the maintenance operation executed after executing the initial operation in the first printer 1A. The second maintenance time TM2 indicates the maintenance operation executed after executing the initial operation in the second printer 1B.

The activation instruction reception unit 211 receives the printer 1 to be firstly activated from the operator via the terminal input unit 24. For example, a printer-to-be-activated input screen is displayed on a touch panel of the terminal input unit 24, and the activation instruction reception unit 211 receives designation of the printer 1 to be firstly activated, based on a touch operation by the operator on the printer-to-be-activated input screen.

For example, an image indicating the first printer 1A, an image indicating the second printer 1B, and an image indicating the third printer 1C are displayed on the printer-to-be-activated input screen. When the operator touches the image indicating the first printer 1A, the activation instruction reception unit 211 receives the first printer 1A as the printer 1 to be firstly activated.

The designation reception unit 212 receives designation of the following printer NX from the operator via the terminal input unit 24. Via the terminal input unit 24, the designation reception unit 212 receives designation of the following printer NX (for example, the second printer 1B) to be activated subsequently to the printer 1 to be firstly activated (for example, the first printer 1A) received by the activation instruction reception unit 211, and receives designation of the following printer NX (for example, the third printer 1C) to be activated subsequently to the second printer 1B.

For example, the following printer input screen is displayed on the touch panel of the terminal input unit 24, and the designation reception unit 212 receives designation of the following printer NX, based on a touch operation by the operator on the following printer input screen.

For example, an image indicating the second printer 1B and an image indicating the third printer 1C are displayed on the following printer input screen. When the operator touches the image indicating the second printer 1B, the designation reception unit 212 receives designation of the following printer NX as the second printer 1B. When the operator touches the image indicating the third printer 1C, the designation reception unit 212 receives designation of the following printer NX as the third printer 1C.

The operator reception unit 213 receives designation of the proficiency UM of the operator who executes the maintenance operation. The operator reception unit 213 causes the proficiency storage unit 217 to store the operator proficiency UM received by the operator reception unit 213 as the proficiency information in which the first maintenance time TM1 and the second maintenance time TM2 are associated with each other.

The clocking unit 214 measures the first elapsed time TQ1 from the timing at which the activation instruction reception unit 211 outputs the activation instruction to the first printer 1A. Further, the clocking unit 214 measures the second elapsed time TQ2 from the timing at which the activation instruction is output to the second printer 1B.

When the activation instruction reception unit 211 receives the first printer 1A as the printer 1 to be firstly activated, the activation instruction unit 215 outputs the activation instruction to the first printer 1A.

Further, when the second printer 1B is designated as the following printer NX to be activated subsequently to the first printer 1A, the activation instruction unit 215 executes the activation instruction processing for outputting the activation instruction to the second printer 1B.

Specifically, in the activation instruction processing, the activation instruction unit 215 outputs the activation instruction to the second printer 1B at the second activation timing obtained based on, with the timing at which the first printer 1A receives the activation instruction as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B.

More specifically, when the second printer 1B is designated as the following printer NX, the activation control unit 115 obtains, based on Equation (1) given below, the first activation time difference TS1 from the timing at which the first printer 1A receives the activation instruction to the second activation timing. Further, when the first elapsed time TQ1 reaches the first activation time difference TS1, the activation control unit 115 outputs an activation instruction to the second printer 1B. For the sake of convenience, Equation (1) is given again.

$$TS1=TP1+TM1-TP2 \tag{1}$$

Further, when the third printer 1C is designated as the following printer NX to be activated subsequently to the second printer 1B, the activation instruction unit 215 executes the activation instruction processing for outputting the activation instruction to the third printer 1C.

Specifically, in the activation instruction processing, the activation instruction unit 215 outputs the activation instruction to the third printer 1C at the third activation timing obtained based on, with the timing at which the activation instruction is output to the second printer 1B as a starting point, the second initial operation time TP2 required for the initial operation of the second printer 1B, the second maintenance time TM2 required for the maintenance operation executed after the second printer 1B executes the initial operation, and the third initial operation time TP3 required for the initial operation of the third printer 1C.

More specifically, when the third printer 1C is designated as the following printer NX subsequent to the second printer 1B, the activation instruction unit 215 obtains, based on Equation (2) given below, the second activation time difference TS2 from the timing at which the activation instruction is output to the second printer 1B to the third activation timing. Then, when the second elapsed time TQ2 reaches the second activation time difference TS2, the activation instruction unit 215 outputs the activation instruction to the third printer 1C. For the sake of convenience, Equation (2) is given again.

$$TS2=TP2+TM2-TP3 \quad (2)$$

The activation instruction unit 215 corresponds to one example of an "activation control unit".

Next, the printer 1 is described. The first printer 1A, the second printer 1B, and the third printer 1C have substantially the same configurations, and hence the configuration of the first printer 1A is described, and description of the second printer 1B and the third printer 1C is omitted.

The first printer 1A includes the printer control unit 11, the printer communication unit 12, the printer storage unit 13, the printer input unit 14, the printer display unit 15, the printing unit 16, the ink supplying unit 17, and the printing medium accommodation unit 18.

As a functional block, the printer control unit 11 includes the activation control unit 115.

When the activation instruction is received from the activation instruction unit 215 of the terminal device 2, the activation control unit 115 executes the initial operation, and shifts the first printer 1A to a printable state.

Figure 8:
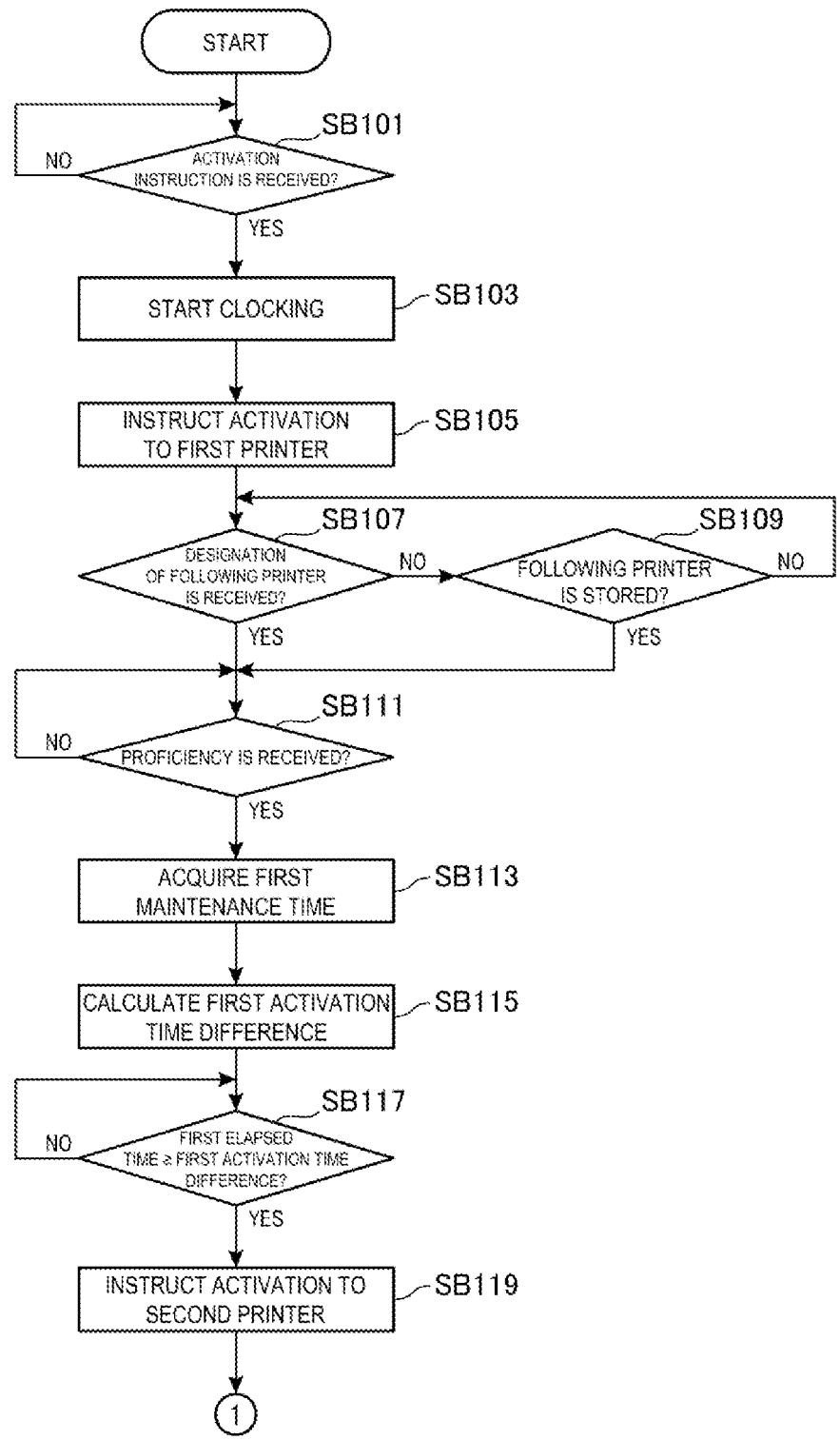
FIG. 8 is a flowchart illustrating one example of processing of a terminal control unit.
Figure 9:
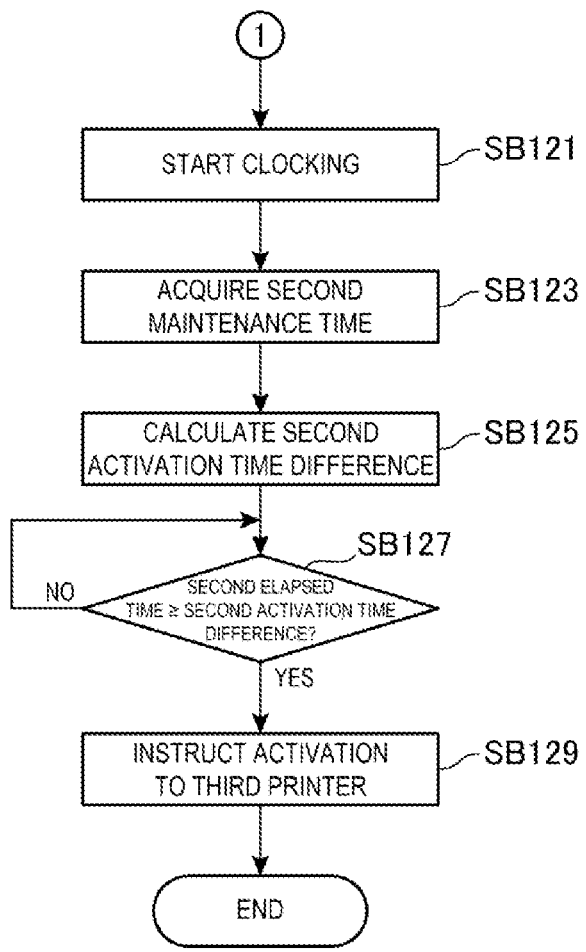
FIG. 9 is a flowchart illustrating one example of processing of the terminal control unit.

Next, with reference to FIG. 8 and FIG. 9, description is made on one example of processing of the terminal device 2.

Each of FIG. 8 and FIG. 9 is a flowchart illustrating one example of processing of the terminal control unit 21 of the terminal device 2.

As illustrated in FIG. 8, first, in Step SB101, the activation instruction reception unit 211 determines whether, for example, the first printer 1A is received from the operator as the printer 1 to be firstly activated.

When the activation instruction reception unit 211 determines that the printer 1 to be firstly activated is not received from the operator (NO in Step SB101), the processing is in a standby state. When the activation instruction reception unit 211 determines that the printer 1 to be firstly activated is received from the operator (YES in Step SB101), the processing proceeds to Step SB103.

Then, in Step SB103, the clocking unit 214 starts measurement of the first elapsed time TQ1.

Subsequently, in Step SB105, the activation instruction unit 215 outputs the activation instruction to the first printer 1A. Note that the activation control unit 115 of the first printer 1A receives the activation instruction, executes the initial operation, and shifts the first printer 1A to a printable state.

Subsequently, in Step SB107, the designation reception unit 212 determines whether designation of the following printer NX to be activated subsequently to the first printer 1A (for example, the second printer 1B) and the following printer NX to be activated subsequently to the second printer 1B (for example, the third printer 1C) is received from the operator.

When the designation reception unit 112 determines that designation of the following printers NX is received from the operator (YES in Step SB107), the processing proceeds to Step SB111. When the designation reception unit 112 determines that designation of the following printers NX is not received from the operator (NO in Step SB107), the processing proceeds to Step SB109.

Then, in Step SB109, the terminal control unit 21 determines whether the activation order storage unit 116 store the identification information about the following printers NX.

When the terminal control unit 21 determines that the activation order storage unit 116 do not store the identification information about the following printers NX (NO in Step SB109), the processing returns to Step SB107. When the terminal control unit 21 determines that the activation order storage unit 116 stores the identification information about the following printers NX (YES in Step SB109), the processing proceeds to Step SB111.

Then, in Step SB111, the operator reception unit 213 determines whether designation of the proficiency UM of the operator who executes the maintenance operation is received.

When the operator reception unit 213 determines that designation of the proficiency UM is not received (NO in Step SB111), the processing is in a standby state. When the operator reception unit 213 determines that designation of the proficiency UM is received (YES in Step SB111), the processing proceeds to Step SB113.

Then, in Step SB113, the activation instruction unit 215 acquires the first maintenance time TM1 from the proficiency storage unit 217.

Subsequently, in Step SB115, the activation instruction unit 215 calculates the first activation time difference TS1 from Equation (1) given above.

Subsequently, in Step SB117, the activation instruction unit 215 determines whether the first elapsed time TQ1 is equal to or greater than the first activation time difference TS1.

When the activation instruction unit 215 determines that the first elapsed time TQ1 is not equal to or greater than the first activation time difference TS1 (NO in Step SB117), the processing is in a standby state. When the activation instruction unit 215 determines that the first elapsed time TQ1 is equal to or greater than the first activation time difference TS1 (YES in Step SB117), the processing proceeds to Step SB119.

Then, in Step SB119, the activation instruction unit 215 outputs the activation instruction to the second printer 1B. Note that the activation control unit 115 of the second printer 1B receives the activation instruction, executes the initial operation, and shifts the second printer 1B to a printable state.

Subsequently, as illustrated in FIG. 9, in Step SB121, the clocking unit 214 starts measurement of the second elapsed time TQ2.

Subsequently, in Step SB123, the activation instruction unit 215 acquires the second maintenance time TM2 from the proficiency storage unit 217.

Subsequently, in Step SB125, the activation instruction unit 215 calculates the second activation time difference TS2 from Equation (2) given above.

Subsequently, in Step SB127, the activation instruction unit 215 determines whether the second elapsed time TQ2 is equal to or greater than the second activation time difference TS2.

When the activation instruction unit 215 determines that the second elapsed time TQ2 is not equal to or greater than the second activation time difference TS2 (NO in Step SB217), the processing is in a standby state. When the activation instruction unit 215 determines that the second elapsed time TQ2 is equal to or greater than the second activation time difference TS2 (YES in Step SB217), the processing proceeds to Step SB219.

Then, in Step SB219, the activation instruction unit 215 outputs the activation instruction to the third printer 1C. Note that the activation control unit 115 of the third printer 1C receives the activation instruction, executes the initial operation, and shifts the third printer 1C to a printable state. Then, the processing is terminated.

As described above with reference to FIG. 7 to FIG. 9, the printing system 100B according to the second exemplary embodiment includes the first printer 1A configured to execute the initial operation to transition to a printable state when receiving the activation instruction and the second printer 1B configured to execute the initial operation to transition to a printable state when receiving the activation instruction. When the second printer 1B is designated as the following printer NX to be activated subsequently to the first printer 1A, the activation instruction processing of outputting the activation instruction to the second printer 1B is executed. In the activation instruction processing, the activation instruction is output to the second printer 1B at the second activation timing obtained based on, with the timing at which the first printer 1A receives the activation instruction as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B.

With this configuration, the activation instruction is output to the second printer 1B at the second activation timing obtained based on the first initial operation time TP1, the first maintenance time TM1, and the second initial operation time TP2 with the timing at which the first printer 1A receives the activation instruction as a starting point. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

Further, the printing system 100B includes the terminal device 2 communicably connected to the first printer 1A and the second printer 1B. The terminal device 2 includes the designation reception unit 212 configured to receive designation of the following printer NX and the activation instruction unit 215. The activation instruction unit 215 outputs the activation instruction to the first printer 1A, obtains the second activation timing based on, with the timing at which the activation instruction is output to the first printer 1A as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B, and outputs the activation instruction to the second printer 1B at the second activation timing.

With this configuration, the activation instruction is output to the second printer 1B at the second activation timing obtained based on the first initial operation time TP1, the first maintenance time TM1, and the second initial operation time TP2 with the timing at which the first printer 1A receives the activation instruction as a starting point. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

A method of controlling the printer 1 according to the second exemplary embodiment is a method of controlling activation of the printer 1 for activating the first printer 1A configured to execute the initial operation to transition to a printable state when receiving the activation instruction and the second printer 1B configured to execute the initial operation to transition to a printable state when receiving the activation instruction. The activation instruction processing of outputting the activation instruction to the second printer 1B is executed when the second printer 1B is designated as the following printer NX to be activated subsequently to the first printer 1A. In the activation instruction processing, the activation instruction is output to the second printer 1B at the second activation timing obtained based on, with the timing at which the first printer 1A receives the activation instruction as a starting point, the first initial operation time TP1 required for the initial operation of the first printer 1A, the first maintenance time TM1 required for the maintenance operation executed after the first printer 1A executes the initial operation, and the second initial operation time TP2 required for the initial operation of the second printer 1B.

With this configuration, the activation instruction is output to the second printer 1B at the second activation timing obtained based on the first initial operation time TP1, the first maintenance time TM1, and the second initial operation time TP2 with the timing at which the first printer 1A receives the activation instruction as a starting point. Thus, the second printer 1B can be activated at appropriate timing. Therefore, generation of the waiting time TW for the operator can be suppressed. Further, the power consumption period TR during which excessive power consumption is caused can be suppressed, and hence reduction of lifetimes of the consumables can be suppressed.

In the printing system 100B according to the second exemplary embodiment, the terminal device 2 is configured as, for example, a personal computer. However, the printing system 100B according to the second exemplary embodiment is not limited thereto. The terminal device 2 may be configured as a tablet terminal and a smartphone.

In the printing system 100B according to the second exemplary embodiment, the terminal device 2 is communicably connected to the first printer 1A, the second printer 1B, and the third printer 1C via the LAN. However, the printing system 100B according to the second exemplary embodiment is not limited thereto. It is only required that the terminal device 2 be communicably connected to the first printer 1A, the second printer 1B, and the third printer 1C. The terminal device 2 may be communicably connected to the first printer 1A, the second printer 1B, and the third printer 1C via, for example, a WAN. Further, the terminal device 2 may be communicably connected to the first printer 1A, the second printer 1B, and the third printer 1C via, for example, the Internet. Further, the terminal device 2 may be communicably connected to the first printer 1A, the second printer 1B, and the third printer 1C via, for example, a wireless communication.

Note that, the first exemplary embodiment and the second exemplary embodiment merely represent aspects of the present disclosure and any modifications and applications may be made within the scope of the present disclosure.

For example, in the first exemplary embodiment and the second exemplary embodiment, each of the printing system 100A and the printing system 100B includes the first printer 1A, the second printer 1B, and the third printer 1C, but is not limited thereto. It is only required that the printing system 100A include two or more printers 1. Each of the printing system 100A and the printing system 100B may include two printers 1. Each of the printing system 100A and the printing system 100B may include four or more printers 1.

Further, in the first exemplary embodiment and the second exemplary embodiment, an ink jet-type printer using ink as a printing material is given as an example. Alternatively, for example, an electro-photographic printer using toner as a printing material may be used.

Further, for example, when the method of controlling activation of the printer 1 according to the first exemplary embodiment and the second exemplary embodiment is to be achieved by using a computer included in the printer 1 or the terminal device 2, the present disclosure can be configured as a program executed by the computer for achieving the method, a recording medium for recording the program in a format readable by the computer, or a transmission medium for transmitting the program. The recording medium described above may be a magnetic recording medium, an optical recording medium, or a semiconductor memory device. Specifically, a portable or stationary type recording medium, such as a flexible disk, an HDD, a Compact Disk Read Only Memory (CD-ROM), a Digital Versatile Disk (DVD), a Blu-ray (trade name) Disc, a magneto-optical disk, a flash memory, a card type recording medium, and the like may be exemplified. Further, the recording medium described above may be a non-volatile storage device such as a RAM, a ROM, and an HDD, all representing internal storages included in the printer 1.

Further, the functions of the printer control unit 11 and the terminal control unit 21 may be achieved by one or a plurality of processors or a semiconductor chip. For example, each of the printer control unit 11 and the terminal control unit 21 may have a configuration further including an auxiliary processing device (co-processor) such as a System-on-a-Chip (SoC), a Micro Control Unit (MCU), and a Field-Programmable Gate Array (FPGA). Further, each of the printer control unit 11 and the terminal control unit 21 may perform various control by causing both of the CPU and the auxiliary processing device to work in cooperation or selectively using one of the CPU and the auxiliary processing device.

Further, for example, the processing units in the flowcharts of FIG. 4, FIG. 5, FIG. 6, FIG. 8, and FIG. 9 are obtained by dividing the processing in accordance with the main processing contents to facilitate the understanding of the processing of the printer control unit 11 and the terminal control unit 21. Thus, the present disclosure is not limited by a division method for obtaining processing units and a name. The number of processing units may be obtained by division in accordance with processing contents. Further, division may be performed so that one processing unit contains the greater number of processing contents. Further, the order of the processing contents may be switched as long as it does not affect the spirit of the present disclosure.

Further, each functional unit illustrated in FIG. 1 and FIG. 7 indicates a functional configuration, and a specific implementation is not particularly limited. Specifically, hardware that individually corresponds to each of the functional units is not necessarily implemented, and a configuration is possible as a matter of course in which a single processor executes a program to enable functions of a plurality of functional units. Further, in the above-described exemplary embodiments, some of the functions achieved by software may be achieved by hardware, or some of the functions achieved by hardware may be achieved by software. In addition, the specific detailed configurations of other parts of the printer 1 and the terminal device 2 may be modified as desired within the spirit of the present disclosure.

What is claimed is:

1. A printing system, comprising:
a first printing apparatus configured to execute an initial operation to transition to a printable state when receiving an activation instruction; and
a second printing apparatus configured to execute an initial operation to transition to a printable state when receiving an activation instruction, wherein
activation instruction processing for outputting the activation instruction to the second printing apparatus is executed when the second printing apparatus is designated as a following printing apparatus to be activated subsequently to the first printing apparatus, and
in the activation instruction processing, the activation instruction is output to the second printing apparatus at second activation timing obtained based on, with timing at which the first printing apparatus receives the activation instruction as a starting point, a first initial operation time required for the initial operation of the first printing apparatus, a first maintenance time required for a maintenance operation executed after the first printing apparatus executes the initial operation, and a second initial operation time required for the initial operation of the second printing apparatus.

2. The printing system according to claim 1, wherein the first printing apparatus includes:
an activation instruction reception unit configured to receive the activation instruction;
a designation reception unit configured to receive designation of the following printing apparatus;
a clocking unit configured to measure an elapsed time from the timing at which the first printing apparatus receives the activation instruction; and
an activation control unit configured to execute the activation instruction processing,
when the second printing apparatus is designated as the following printing apparatus, the activation control unit obtains an activation time difference from the timing at which the first printing apparatus receives the activation instruction to the second activation timing based on Equation (A) given below, $$TS1=TP1+TM1-TP2 \tag{A}$$

where, in Equation (A), TP1 indicates the first initial operation time, TM1 indicates the first maintenance time, TP2 indicates the second initial operation time, and TS1 indicates the activation time difference, and when the elapsed time reaches the activation time difference, the activation control unit outputs the activation instruction to the second printing apparatus.

3. The printing system according to claim 2, wherein
at the time of obtaining the activation time difference, when the elapsed time is equal to or greater than the activation time difference, the activation control unit outputs the activation instruction to the second printing apparatus.

4. The printing system according to claim 2, comprising:
an operator reception unit configured to receive designation of proficiency of an operator who executes the maintenance operation; and
a storage unit configured to store proficiency information in which the proficiency of the operator and the first maintenance time are associated with each other, wherein
the activation control unit acquires the first maintenance time corresponding to the proficiency of the operator based on the proficiency information, and obtains the activation time difference from the first maintenance time obtained.

5. The printing system according to claim 4, wherein
the storage unit includes an activation order storage region configured to store information about the following printing apparatus,
when the information about the following printing apparatus is stored in the activation order storage region, and the designation reception unit receives an instruction indicating that designation of the following printing apparatus is not performed, the activation control unit outputs the activation instruction to the following printing apparatus stored in the activation order storage region as the following printing apparatus.

6. The printing system according to claim 1, comprising:
a third printing apparatus configured to execute an initial operation to transition to a printable state when receiving an activation instruction, wherein
when the third printing apparatus is designated as a following printing apparatus to be activated subsequently to the second printing apparatus, the activation instruction processing issues the activation instruction to the third printing apparatus,
in the activation instruction processing, the activation instruction is output to the third printing apparatus at third activation timing obtained based on, with timing at which the second printing apparatus receives the activation instruction as a starting point, the second initial operation time, a second maintenance time required for a maintenance operation executed after the second printing apparatus executes the initial operation, and a third initial operation time required for the initial operation of the third printing apparatus.

7. The printing system according to claim 1, comprising:
an activation control device communicably connected to the first printing apparatus and the second printing apparatus, wherein
the activation control device includes:
a designation reception unit configured to receive designation of the following printing apparatus; and
an activation control unit,
the activation control unit outputs the activation instruction to the first printing apparatus,
the activation control unit obtains second activation timing based on, with timing at which the activation instruction is output to the first printing apparatus as a starting point, a first initial operation time required for the initial operation of the first printing apparatus, a first maintenance time required for a maintenance operation executed after the first printing apparatus executes the initial operation, and a second initial operation time required for the initial operation of the second printing apparatus, and
the activation control unit outputs the activation instruction to the second printing apparatus at the second activation timing.

8. A printing apparatus that executes an initial operation to transition to a printable state when receiving an activation instruction, the printing apparatus comprising:
a communication unit communicably connected to a second printing apparatus configured to execute an initial operation to transition to a printable state when receiving an activation instruction;
an activation instruction reception unit configured to receive the activation instruction;
a designation reception unit configured to receive designation of a following printing apparatus to be activated subsequently to the printing apparatus;
a clocking unit configured to measure an elapsed time from timing at which the activation instruction is received; and
an activation control unit configured to execute activation instruction processing for outputting the activation instruction to the second printing apparatus when the second printing apparatus is designated as the following printing apparatus, wherein
in the activation instruction processing, the activation control unit outputs the activation instruction to the second printing apparatus at second activation timing obtained based on, with timing at which the printing apparatus receives the activation instruction as a starting point, a first initial operation time required for the initial operation of the printing apparatus, a maintenance time required for a maintenance operation executed after the printing apparatus executes the initial operation, and a second initial operation time required for the initial operation of the second printing apparatus.

9. A method of controlling activation of a printing apparatus, the method being used for activating a first printing apparatus configured to execute an initial operation to transition to a printable state when receiving an activation instruction and a second printing apparatus configured to execute an initial operation to transition to a printable state when receiving an activation instruction, wherein
activation instruction processing for outputting the activation instruction to the second printing apparatus is executed when the second printing apparatus is designated as a following printing apparatus to be activated subsequently to the first printing apparatus, and
in the activation instruction processing, the activation instruction is output to the second printing apparatus at second activation timing obtained based on, with timing at which the first printing apparatus receives the activation instruction as a starting point, a first initial operation time required for the initial operation of the first printing apparatus, a first maintenance time required for a maintenance operation executed after the first printing apparatus executes the initial operation, and a second initial operation time required for the initial operation of the second printing apparatus.

* * * * *